(12) United States Patent
Lipscombe et al.

(10) Patent No.: US 8,312,115 B2
(45) Date of Patent: Nov. 13, 2012

(54) NETWORK BOOTING APPARATUS AND METHOD

(75) Inventors: Roger Lipscombe, London (GB); Sophie Chang, London (GB); Andreas Hammarskjold, Stockholm (SE)

(73) Assignee: 1e Limited, London (GB)

( * ) Notice: Subject to any disclaimer, the term of this patent is extended or adjusted under 35 U.S.C. 154(b) by 1022 days.

(21) Appl. No.: 11/642,960

(22) Filed: Dec. 21, 2006

(65) Prior Publication Data

US 2008/0155245 A1    Jun. 26, 2008

(51) Int. Cl.
*G06F 15/177* (2006.01)
(52) U.S. Cl. ........................................ 709/222; 709/220
(58) Field of Classification Search .................... 709/222
See application file for complete search history.

(56) References Cited

U.S. PATENT DOCUMENTS

| | | | |
|---|---|---|---|
| 6,421,777 B1 * | 7/2002 | Pierre-Louis et al. | 713/2 |
| 6,490,677 B1 * | 12/2002 | Aguilar et al. | 713/1 |
| 6,735,692 B1 * | 5/2004 | Murphrey et al. | 713/1 |
| 6,748,525 B1 * | 6/2004 | Hubacher et al. | 713/1 |
| 7,085,921 B2 * | 8/2006 | Frye, Jr. | 713/1 |
| 2006/0143432 A1 | 6/2006 | Rothman et al. | |
| 2006/0159090 A1 | 7/2006 | Chang et al. | |

* cited by examiner

*Primary Examiner* — Larry Donaghue
*Assistant Examiner* — Adam Cooney
(74) *Attorney, Agent, or Firm* — Baker & Hostetler LLP

(57) ABSTRACT

An operating system deployment arrangement provides a database connected to a network for use in monitoring the boot status of machines connected to sub-networks of the network. A workstation connected to a sub-network is adapted to act as a server for a pre-installation environment to machines newly connecting to the sub-network or at the same geographical location. The workstation carries a program for detecting boot initiation messages broadcast on the sub-network and for progressing booting of newly connecting machines in accordance with boot action data held by the database. In particular, the workstation also sends a software agent and operating system deployment processes to a newly connected machine and the agent takes over progression of the booting process from the workstation. The data held in the database for any one machine is updated as booting progresses. Flexibility is provided both in administration of the boot action data held in the database and by means of user interaction software loaded to a newly connected machine in the course of booting.

43 Claims, 12 Drawing Sheets

NETWORK BOOTING APPARATUS AND METHOD

FIELD OF THE INVENTION

The present invention relates to network booting apparatus and to a method of network booting. It finds particular application in booting equipment connected to a sub-network or branch.

BACKGROUND

Large organisations often have several geographically separate branch sites which each have multiple machines, including servers, clients and bare metal machines, connected across their own local network such as a Local Area Network ("LAN"). These machines may be co-ordinated from a central or controlling location, across a larger network such as a Wide Area Network ("WAN").

A server is a piece of equipment that client devices can make requests to for data or software. Although today files can be sent to and received from most other computers, the primary purpose of a server is this inter-device activity. A server is therefore usually characterised by both its hardware and its software, being always network-connected and having large storage capacity and high network connectivity. This allows it to respond to client requests at any time and at high volume. These characteristics make a server relatively expensive.

A bare metal machine is a machine carrying only the software, sometimes known as firmware, that will run when a machine is first powered up. In a personal computer, this might for instance be known as the BIOS or basic input/output system. In a network environment, the firmware allows a machine to connect to a network and to send and receive communications prior to the machine having a network address such as an IP (Internet Protocol) address.

Before a machine is useful in a networked environment such as that of a corporate entity, it needs both an operating system and to be configured appropriately for its role. Known methods for doing this include installing an operating system either from local media or over a network. Organisations often have a set of pre-configured "images" containing the operating system files. The image also provides data required for configuration of the machine and can potentially be large, for example eight or nine gigabytes. Booting is a bootstrapping process that causes operating system programs to execute when a machine is turned on. To deploy operating system files (images), it is known to boot a machine first to a pre-installation environment. This is a lightweight operating system usually booted to random access memory ("RAM") via a network or compact disc ("CD") and providing a cutdown version of a fully featured operating system. The pre-installation environment will provide at least drivers for hardware and for anything else required to enable an operating system installation, but lacks almost all of the applications, accessories and utilities of the fully featured operating system. It is also usually non-specific, one pre-installation environment being capable of use in installing fully featured operating systems from more than one software family. For example, a Linux pre-installation environment could potentially be used to install a Windows XP operating system.

Once the pre-installation environment is present, it is then possible to deploy the operating system image to the local hard disk. Both of these steps will commonly occur over a LAN or WAN network depending upon configuration.

Although the work involved in deploying an image to one machine may not be major, the task of deploying an image to many machines which may be distributed over branch networks, for instance at first installation or after an upgrade, can be very big and often involves much manual effort. It might be managed from a central server, for instance over a WAN, but the management load and traffic over the WAN can be disruptive. For example, machines doing different jobs and/or at different branch sites may need different respective images. It is thus known to provide local boot servers to which the machines can be directed, thus at least partially reducing the load on the WAN. For example, Microsoft Corporation offers a server carrying software providing a "Remote Installation Service" for this purpose.

In more detail, installation might be provided as follows. A "bare metal" machine has firmware, or a network interface card, which allows it to connect to a network in order to find and download a network boot program. This allows the machine to boot from data stored in the network rather than from a disc. Many machines nowadays are equipped to do this using "PXE", a pre-installation environment mechanism originally developed by Intel Corporation. When installation is required, PXE firmware on the bare metal machine broadcasts a DHCPDISCOVER packet with a PXE extension. (DHCP, "Dynamic Host Configuration Protocol", is a widely known and used protocol.) If a PXE-enabled server detects the DHCPDISCOVER packet, it will (amongst other functions) respond by delivering configuration information including the name of a boot image file or network boot program ("NBP") of known type which will enable the bare metal machine to complete installation.

U.S. Pat. No. 7,085,921 discloses an embedded computing system with a central boot server supplying subnets of "target" servers. Embedded computing systems comprise special purpose machines which perform pre-defined tasks, being completely encapsulated by the devices they provide. Examples are routers and automatic telling machines ("ATMs"). Using the PXE mechanism, a target server will use a broadcast message to elicit a response from a PXE server. In order for booting to proceed, there thus needs to be a PXE server that will pick up the broadcast message and U.S. Pat. No. 7,085,921 addresses the issue of how best to provide the PXE servers. Options that U.S. Pat. No. 7,085,921 explicitly avoids are: i) providing a general purpose server of known type on each subnet; and ii) providing specialist machines dedicated in both hardware and software terms to doing the job. A general purpose server would be very underused if its sole purpose were to facilitate communication between target servers and a central boot server, while specialist machines would be expensive to develop. Thus, and instead, additional embedded computers are provided at the subnets as PXE servers. These are based on general purpose hardware rather than conventional server hardware but carry software enabling them to pick up PXE requests and supply a network boot program and the address of the boot server. A target server will then be able to complete the booting process via the boot server. In one arrangement, U.S. Pat. No. 7,085,921 describes supplying boot images (data and software required for a fully booted machine) centrally from the boot server, while in a different arrangement the embedded computers are served boot images from the boot server, and these are stored by the embedded computers for subsequent supply to target servers. It will be appreciated that in both arrangements the boot images are primarily held and managed centrally at the boot server. Since it is concerned with an embedded computing system based specifically on servers, U.S. Pat. No. 7,085, 921 relates to a generally centralised and predefined system in which boot images are relatively small. The largest boot image size quoted is less than 20 MB.

Microsoft™ Corporation deals with networks of general purpose machines for use in many locations and work environments. Microsoft have long offered systems management solutions and now offer an Operating System Deployment ("OSD") Feature Pack which enhances their Systems Management Server 2003 ("SMS") by providing a way of creating and deploying Windows operating system ("OS") images.

The OSD Feature Pack allows an administrator to:
capture an image from an existing computer in a format called the Microsoft Windows Imaging ("WIM") format
customise and manage settings for individual deployments, including distribution and network settings and notifications
preserve user profiles when installing new OSs
deploy OS images
obtain reports on specific deployments for measuring success and troubleshooting However, for some systems the images can be very large, for instance of the order of 10 GB, and in a system with a WAN connection between subnets and a centralised SMS the traffic generated can be a significant problem. It is an option to provide local SMS servers in at least some of the subnets to save bandwidth on the WAN but this is a relatively expensive approach. An enhancement to Microsoft's OSD Feature Pack developed by 1E Ltd, the present applicant, provides a less centralised process for OS deployments without there having to be SMS servers at every branch. This enhancement, known as the OSD Plus Pack, bundles several components to provide the following:

OSD Branch: bandwidth-efficient "download and execute" capabilities which support image distribution to the subnets (or branches) whereby an OSD image is downloaded once over the WAN and then shared locally at the subnet
Local Multicast: increased scalability and speed by using multicast to distribute the OSD image package at the subnet
AppMigrator: automatic reinstallation of the latest versions of applications which existed on a user's machine
PXE Lite: a local ability to deploy images to "bare metal" machines on a subnet using workstations in the role of designated PXE servers OSD Branch and the local multicast facility are both implemented as described in the US patent application published as US2006159090, in the name of the present applicant.

The role of the PXE Lite workstation is effectively to function as a PXE server, thus to deliver a pre-installation environment such as Windows PE to the bare metal machine. However, the PXE Lite workstation is a general purpose end user machine and not a dedicated server. This keeps costs down while reducing network traffic to a centralised facility.

Once a given bare metal machine has received a pre-installation environment, it is enabled to find and install a full operating system and operating system image, which it will do in known manner. In the past, in a system of any complexity, the installation of the full operating system, including data, settings and application software, meant a skilled person had to be available and present at the machine on which installation is taking place in the sub-network, and this is the case even where OSD Branch is used to ensure the local presence of OS images. This represents a high overhead in manpower.

Microsoft's Remote Installation Service ("RIS") goes some way to alleviating the overhead requirement by providing a local server with the ability to administer the OS installation process on machines in its sub-network but firstly there has to be a local server, which is not always present or available, and secondly the requirement for a skilled person at the sub-network remains, albeit at the local server rather than physically present at each installing machine.

SUMMARY OF THE INVENTION

According to a first aspect of embodiments of the present invention, there is provided network booting apparatus, for use in booting a machine connected to a sub-network of a network, which apparatus is adapted for use in computing equipment connected locally in relation to the sub-network, and comprises:

i) a boot initiation message detector for detecting a message sent by the machine to initiate a booting process;
ii) a database interrogator for interrogating a database in relation to boot action data stored in the database; and
iii) a network boot program source for use in providing a network boot program to the machine, the boot initiation message detector being connected to the database interrogator to trigger an interrogation of the database on detection of an initiating message, and the network boot program source being arranged to provide the network boot program to the machine in accordance with said boot action data.

The computing equipment may for example be connected to the same sub-network as the machine, or in the same geographical location, and the boot initiation message detector is arranged to detect said message in the sub-network or geographical location.

Embodiments of the present invention can offer a particularly good solution to the question of flexible deployment of operating systems and/or images to bare metal machines in sub-networks. The presence of the database interrogator allows the behaviour of the network booting apparatus in making network boot programs available to bare metal machines on the sub-network to be determined by the content of the database. If the database is located in the network for access from multiple sub-networks, administration of the boot process can be centralised while the actual boot process remains local.

Preferably, the network booting apparatus is suitable for installation for example on a local workstation. In that case, the deployment can be done even where there is no conventional local server.

In one arrangement, the network boot program comprises a pre-installation environment together with a further database interrogator for interrogating a database in relation to boot action data stored in the database. The machine itself is then enabled to interrogate a database and to progress with booting in a manner at least partly controlled by the database content.

Preferably, the network boot program source is adapted to select a network boot program for provision to the machine from two or more different network boot programs, the selection being made in accordance with said boot action data. A first of the different network boot programs might comprise the pre-installation environment and further database interrogator described above, while a second of the different network boot programs may be arranged to cause the booting machine to cease booting from the network. For example it may instead be caused to boot from its own hard disk. If both these types of network boot programs are available, this means that, depending on the boot action data received from the database, the booting machine itself is enabled to interrogate a database and to progress with booting in a manner at least partly controlled by the database content. If, however, a different selected boot program is delivered to the machine, that boot program might terminate network booting and cause the machine to boot to the operating system already present on its hard disk. This can prevent network booting when an operating system is already present on the machine.

The further steps in a network booting process may comprise locating and installing an operating system from a local storage location, preferably on the same sub-network or branch location. Now a machine on a sub-network can potentially be booted either through local installation of a new operating system, appropriate for instance in the case of a bare metal or failed machine, or to its own hard disk which is appropriate where the machine already has an operating system installed.

Preferably the first of the at least two different network boot programs further comprises a hardware data reader for obtaining a hardware inventory in relation to the machine for delivery to the database. This supports additional tailoring of at least said further steps in a boot process in that boot action data received from the database can be adapted to the hardware available at the machine. For example, the type of operating system, or parameters of the operating system, can be tailored in respect of the hardware inventory. It is already known for hardware data to be obtainable, even on a bare metal machine, and thus the hardware data reader takes advantage of a known facility in a particularly useful manner.

A workstation in this context comprises a machine carrying at least some general purpose software, such as a copy of Microsoft Windows (a registered trade mark of Microsoft Corporation), a general purpose office software suite such as Microsoft Office (a registered trade mark of Microsoft Corporation) and perhaps a specialised software package such as an accounting or customer-relationship package. It is primarily intended for use by a single user at any one time and has a user interface for the running of software which is either stored on the workstation or is accessible over a network. Although the term might encompass a personal computer, it is not intended to cover a conventional server.

A network boot program is intended herein to mean software, optionally including data, that can be used in booting a machine. A network boot program may optionally be provided in the form of one or more files or images, and can include for instance network boot files such as the known files "STARTROM.N12" and "STARTROM.F12", configuration information and an executable for deploying a network boot file, and/or a pre-installation environment such as Windows PE.

Where a network boot program provided by the network boot program source comprises a further database interrogator, this enables the boot process that is followed by a booting machine to be further tailored to real time conditions. For example, a machine might be due to install an operating system. The database interrogator present on the computing equipment in the sub-network may then obtain a boot action value from the database which triggers provision of a network boot program to the machine which supports installation of an operating system. If the network boot program comprises a further database interrogator, then the further database interrogator may obtain from the database an identity for the operating system to be installed. Alternatively, the further database interrogator may obtain from the database a value which causes the machine to provide a user prompt, allowing an operating system to be chosen and identified to the machine by a user, or a value which causes the machine to poll the database until such time as an identity for an operating system can be provided at the database.

Preferably, a network boot program for provision to the machine which supports installation of an operating system comprises operating system deployment functionality for use with a systems management system. This means that once an identity for an operating system has been obtained at the machine, the operating system itself can be installed using for example a known systems management system such as Microsoft Corporation's SMS products.

Sub-networks and branches, or branch sites, are referred to herein. A branch is the physical location of part of a large organisation such as an office in a particular town. A sub-network or subnet on the other hand relates to part of a communications network used by the organisation rather than to a physical location, and essentially divides a larger network infrastructure into smaller network portions. Typically, all of the machines on a subnet are able to communicate directly with each other, without the need for routers or gateway devices. A subnet would however normally reflect a physical network boundary. For example, one office (or branch) would comprise one subnet, where all of the machines can communicate with each other; another office (or branch) would comprise another subnet. For the machines in the different subnets to communicate, there needs to be a router or gateway in between the subnets. In a more complex environment, it is possible to have multiple subnets in a single office or branch, just as it is possible (with correctly-configured routers) to have a single subnet span across more than one physical location. Network booting usually relies on messages broadcast by a newly booting machine within a sub-network. Hence boot server functionality is required within each sub-network to support network booting.

Although the database can be located in the sub-network environment that is on the same sub-network or on a sub-network at the same geographical location such as the same branch, it is preferable that it is located centrally. This allows easier central administration and accessibility over the network where many geographical branch locations require configuration information. The traffic generated by interrogation of the database is tiny compared to the downloading of OS images and, in a sub-network environment, it is preferable that the database is located centrally with respect to two or more sub-networks.

The network boot program source might comprise for example a data store holding one or more network boot programs or holding location data such as the path and file name of one or more boot programs stored on the computing equipment and/or a network address for a network boot program stored elsewhere.

According to a second aspect of the present invention, there is provided computing equipment, preferably a workstation, comprising network booting apparatus according to an embodiment of the invention in its first aspect.

According to a third aspect of the present invention, there is provided a network booting system comprising network booting apparatus according to an embodiment of the present invention and further comprising an administrative console having a user interface for viewing and updating at least one variable stored in the or each database.

According to a fourth aspect of the present invention, there is provided operating system deployment apparatus comprising a database for storing boot action data, the database being accessible via a network having two or more sub-networks, and further comprising network booting apparatus according to an embodiment of the present invention installed on computing equipment connected to at least one of said two or more sub-networks.

According to a fifth aspect of the present invention, there is provided a method of booting a machine connected to a sub-network of a communications network, the method comprising the steps of:

i) detecting a message sent by the machine to initiate a booting process;
ii) on detection of a message, interrogating a database in relation to boot action data stored in the database; and
iii) providing to the machine a network boot program, from a storage system connecter to the sub-network, in accordance with the boot action data.

Embodiments of the invention support local provisioning of booting files and data while retaining an optimal degree of central administration. The location of network boot files and images can be configured locally so that administration of current sub-network boot program locations does not have to be performed centrally. This can provide huge bandwidth advantages since the files and images are no longer downloaded by each workstation on a sub-network, for instance over the WAN as described above. Meanwhile, there can still be central administration of booting processes, particularly the co-ordination and updating of operating systems from a centralised SMS environment to local storage locations. "Local" or "locally" is used generally herein to mean, unless the context indicates otherwise, on the same sub-network or on a sub-network at the same geographical location such as the same branch.

In known DHCP-based protocols, a DHCP server is provided as a central resource accessible to all sub-networks. When a machine on a sub-network boots up, it obtains a network address, together with the network boot program location, from the centralised DHCP server. In embodiments of the present invention, a centralised DHCP server might still provide a network address to the machine but network booting apparatus installed on computing equipment, such as a workstation, in the same sub-network or branch, can detect that a local machine is going to boot up and it is the local computing equipment that provides the network boot program location instead of the DHCP server.

Embodiments of the invention can deal with the situation in which the machine is a bare metal machine by the use of a known form of pre-installation environment such as PXE to give the network boot program.

The database interrogator in embodiments of the invention according to its first aspect, for interrogating a database for boot action data, is a particularly useful feature of embodiments of the invention, since it allows machines to boot from the hard disk instead of always from the network, and thereby avoids re-installing an operating system unnecessarily; conversely it allows a machine's boot process to be alerted to operating system updates.

BRIEF DESCRIPTION OF DRAWINGS

A network booting arrangement will now be described as an embodiment of the present invention, by way of example only, with reference to the accompanying figures in which.

DETAILED DESCRIPTION

In the following, the words "branch network" are used synonymously with "sub-network" since, in the embodiments being described, the network context is one in which each branch of an organisation is served by a single sub-network. However, as mentioned above, it should be noted that in practice there may be more than one sub-network to serve a branch and one sub-network may serve more than one branch.

A PXE-based embodiment of the invention for equipment having Microsoft Windows NT-based operating systems that operate on the x86 architecture is described below but it will be understood that embodiments of the invention might equally be based on other pre-installation environments.

Figure 1:
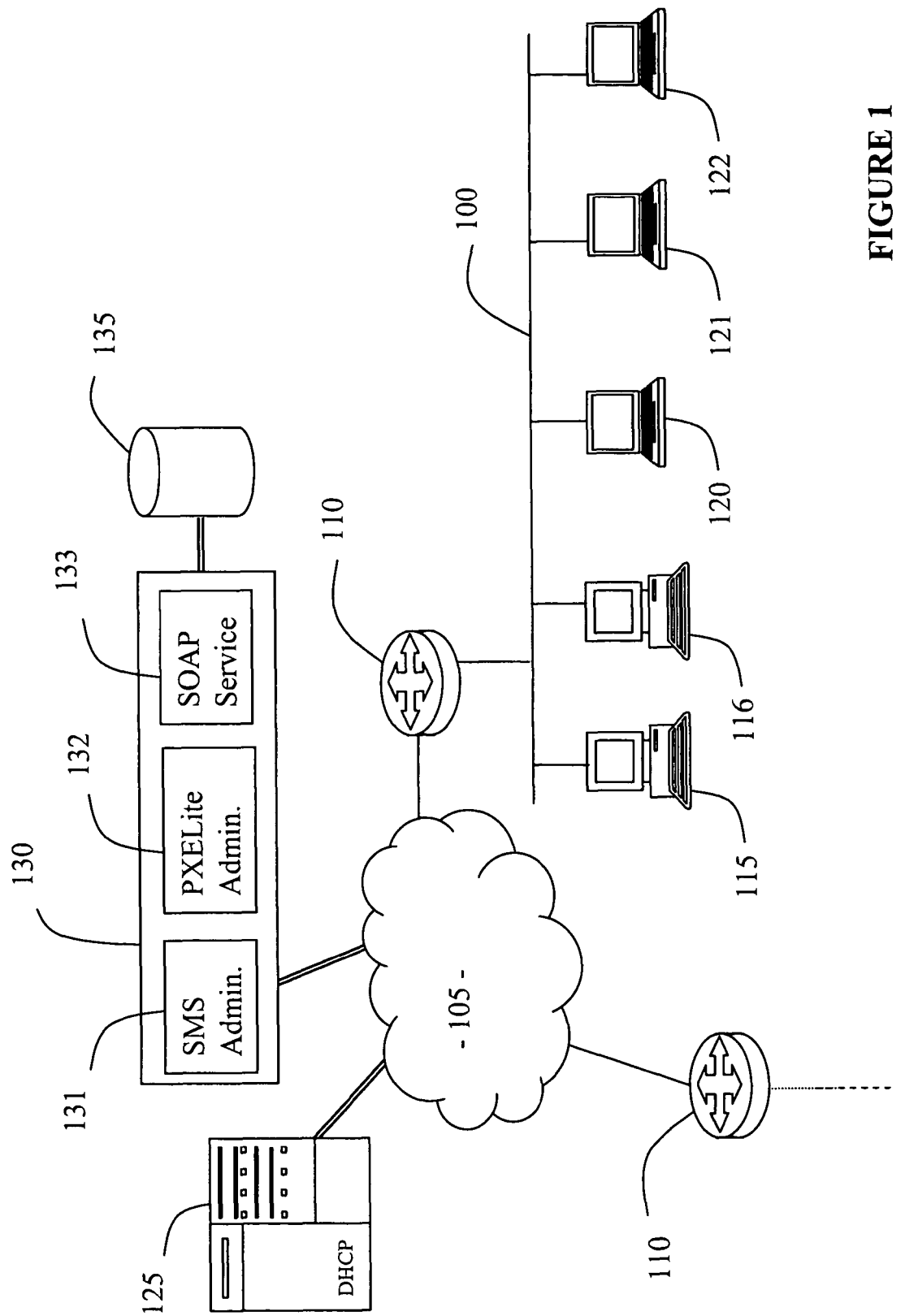
FIG. 1 shows a network environment including a WAN and at least one sub-network in which network booting takes place.

Referring to FIG. 1, a DHCP server 125, a SMS server 130 and a database 135, each of known type, are connected to a WAN 105 to which several branch networks 100 (only one shown) are also connected via routers 110. Machines of different types are connected to the branch network 100, such as personal computers 115, 116 and workstations 120, 121, 122. Each machine is equipped with conventional data storage and there may be an additional shared storage resource (not shown), again configured in a known manner.

The DHCP server 125 is of known type and will deliver a dynamic Internet Protocol ("IP") address in response to DHCPDISCOVER messages issued by any machine on a sub-network 100. When any machine first connects to the network, it will broadcast a DHCPDISCOVER message. It has to broadcast the message as it has no network address at this stage. The DHCP server 125 detects the DHCPDISCOVER message and responds with a DHCPOFFER message, offering various types of data and including a network address for the newly started machine. The machine can accept any or all of the data. In embodiments of the present invention, in accordance with known DHCP behaviour, it accepts the network address by sending a DHCPREQUEST message which the DHCP server 125 will acknowledge by sending a DHCPACK message.

DHCP messages are transmitted in packets which have a fixed size header. Data can be held in the header or by populating numbered field options within the message body. In practice, the header has enough space to carry a network address for a newly booting machine.

SMS downloads are delivered from the SMS server 130 over the WAN 105 using a known arrangement such as that described in US2006159090, mentioned above. For instance, when a new package is available, it is advertised by the SMS server 130 which alerts the machines 115, 116, 120, 121, 122 on the branch network 100. This triggers a selection process at the branch network 100 and causes one of the machines 115, 116, 120, 121, 122 to be elected as an active download master. Microsoft Corporation's OSD Feature Pack together with 1E's OSD Branch support in-place operating system upgrades, such as from Windows 2000 to Windows XP, using the mechanism described in US2006159090 to distribute the image files. These mechanisms are used to ensure that the following are present on at least one nominated machine 120 in each sub-network:

a network boot program

Windows PE pre-installation files
WIM images as required
PXE Lite server equivalent software Alternatively, the PXE Lite components can support a system such as Windows NT 4.0, meaning it is not necessary to do an in-place upgrade before distributing image files.

Consequently, up-to-date operating system images will be available on each nominated machine at a branch network 100.

It would be an option to have more than one nominated machine at any branch network 100 as it is a feature of the DHCP/PXE protocols that a client may receive multiple DHCPOFFER packets but can then select which to respond to with a DHCPREQUEST message.

A "PXE Lite" administrator's console 132 for administering PXE Lite functionality is provided centrally and may reside for example on the same platform as the SMS server 130 and SMS administration console 131. For ease of use, the PXE Lite administrator's console 132 is designed to emulate the functions of the SMS administrator's console 131 which in turn is equivalent to the same component of the known Microsoft SMS equipment.

At least one of the workstations 120 on the sub-network 100 is designated to have the role of a PXE Lite server and this machine will have installed on it PXE Lite programs and images to support it in that role. The database 135 carries boot state information for any of the machines 115, 116, 120, 121, 122 on the branch network 100 which have attempted to PXE boot and the PXE Lite workstation 120 can interrogate the database 135 via a web service 133 using SOAP (Simple Object Access Protocol).

It would be possible for the database 135 to be queried directly but the use of a web service gives an opportunity to improve network infrastructure security in an enterprise.

It will be understood that the particular configuration of the various components shown in the accompanying figures is not essential. For example, although shown separately in FIG. 1, the database 135 may conveniently share platform with the PXE Lite administrator's console 132 or be sited remotely, for querying via the Internet or a private network. Similarly, software functions such as the PXE Lite administrative console 132 and the SOAP service 133 may share platform or be installed on separate platform.

The Database 135 and Soap Web Service 133

Figure 3:
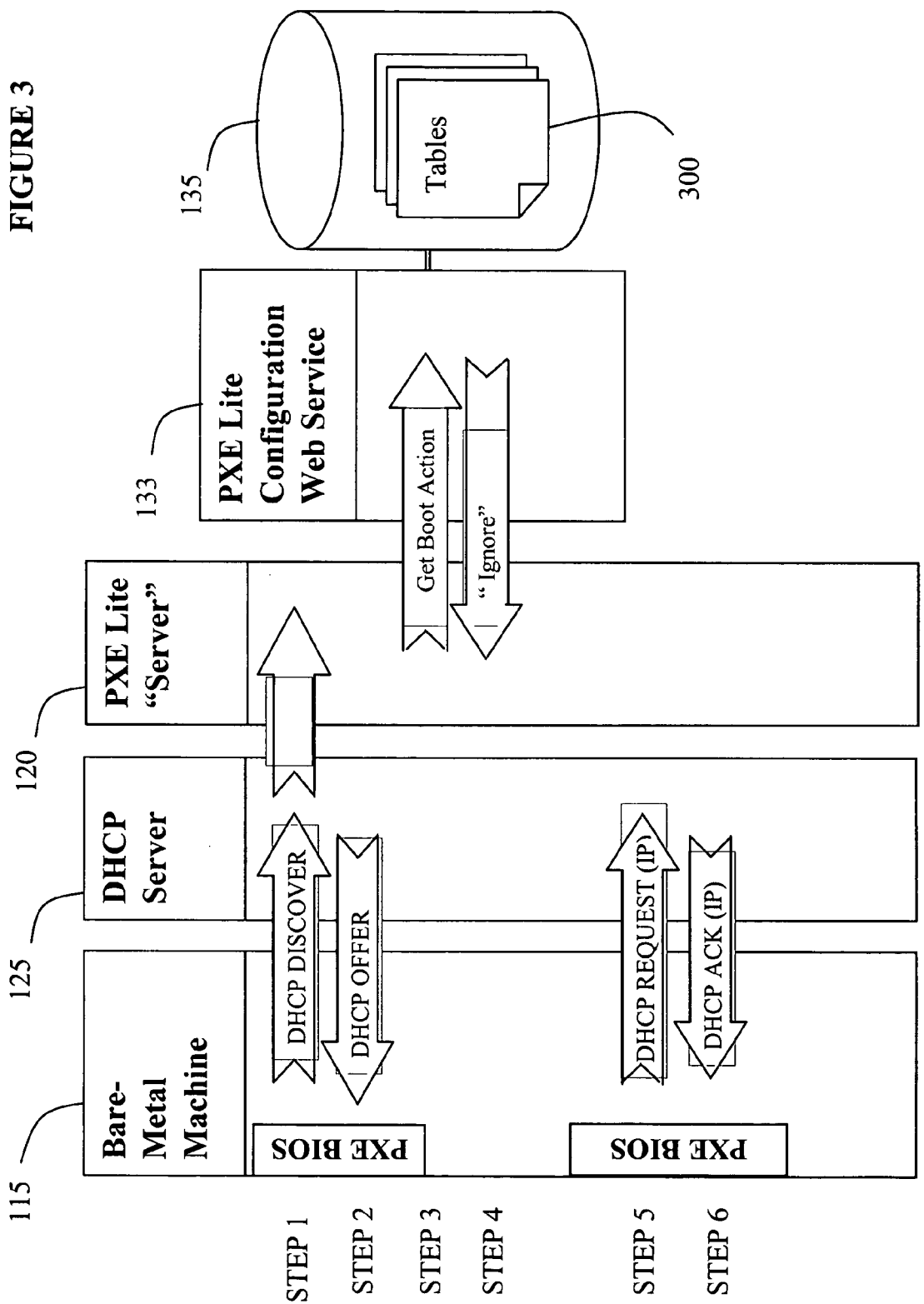
FIGS. 3 to 9 show schematic flow diagrams of boot processes occurring in use of the network environment of FIG. 1.

Referring now to FIG. 3, the database 135 and the SOAP web service 133 are arranged to control the boot process for any of the machines 115, 116, 120, 121, 122. The database 135 stores values in relation to the machines 115, 116, 120, 121, 122 for a number of variables and the SOAP web service 133 supports a set of methods for interrogating the database 135 in respect of those variables. When a method is called, the SOAP web service 133 will return a value which is dependent on at least two factors: on the specific method selected and on the value for a machine which is stored by the database 135 for a relevant variable. Thus, if the database 135 is interrogated with respect to the same variable but using two different methods, then for at least one stored value (or "instance") of the variable in the database 135 each method may return a different value.

The database 135 contains several tables 300. A machine becomes known to the database 135 when it is specified in a "Get Boot Action" or "Get Agent Action" request, as further described below. Once known, data for a machine is entered to tables 300 of the database 135. These tables 300 include the following:

"tb_PXELite_Computers": this holds one row for each "known" machine 115, 116, 120, 121, 122. When either of the methods "Get Boot Action" or "Get Agent Action" is first called for a machine, a row for the new machine 115, 116, 120, 121, 122 is inserted into the "Computers" table.

In more detail, the table "tb_PXELite_Computers" has the following fields for holding information about each known machine:

MAC Address
Machine Name—this is one of the values that must be passed to OSD, and it's stored in this table for convenience—it makes it easier to find a machine later.
IP Address/Subnet—stored here for convenience in identifying a machine later.
TimeStamp—the date/time of when this machine record was last changed. This makes it easier to see newly-added computers in the user interface.
NextAction—this contains one of five boot status values which will determine a next action of the machine. The values are further discussed below, including for example "ignore" and "deploy".
Status—a string that's updated to reflect what the machine is currently doing. For example, if a machine is waiting, the machine status string is set to "waiting". If it's started installing the OS image, the status string is set to "installing". Values are thus entered or updated in this table as interaction with a new machine progresses. The machine status string is human-readable text which is displayed for information only at the PXE Lite administrator's console 132.

"tb_PXELite_Settings": this controls the default action for a new machine 115, 116, 120, 121, 122 which is present in the row first entered in the table "tb_PXELite_Computers" for that machine. Values will generally be entered or updated in this table via the PXE Lite administrator console 132.

"tb_PXELite_HardwareInventory": this contains hardware information about each known machine 115, 116, 120, 121, 122 such as the manufacturer and model, the CPU model and potentially an asset tag (although this last requires correct configuration of the machine). The format of this table is flexible to allow for new values to be included in future versions. The hardware information is visible to the PXE Lite administrative console 132 and allows the administrator to decide which image to deploy to a particular machine. It can alternatively support an automated process for determining which image to deploy. For any one machine, the hardware information is sent from the PXE Lite agent 220 before it calls a "GetAgentAction" SOAP method, as further mentioned below in relation to "STEP 11" shown in FIGS. 6 to 9.

"tb_PXELite_Jobs": this contains a list of pending, in-progress and past jobs, along with progress and status information, in relation to each operating system available via the PXE Lite mechanism. The OSD package ID and program name are stored as a "job" in this table and will be cross-referenced to the MAC addresses of relevant machines 115, 116, 120, 121, 122. During the PXE Lite process for any one machine 115, 116, 120, 121, 122, the most recent row of this table is taken for a given MAC address and time-stamped. All of the rows of this table can be viewed via the PXE Lite administrator console 132.

The operation of the database 135 and the SOAP web service 133 are further described below, particularly in relation to the flow diagrams of FIGS. 3 to 9 and to FIG. 12.

PXE Lite Workstation 120 and Overview of the Booting Process on the Bare Metal Machine 115

Figure 2:
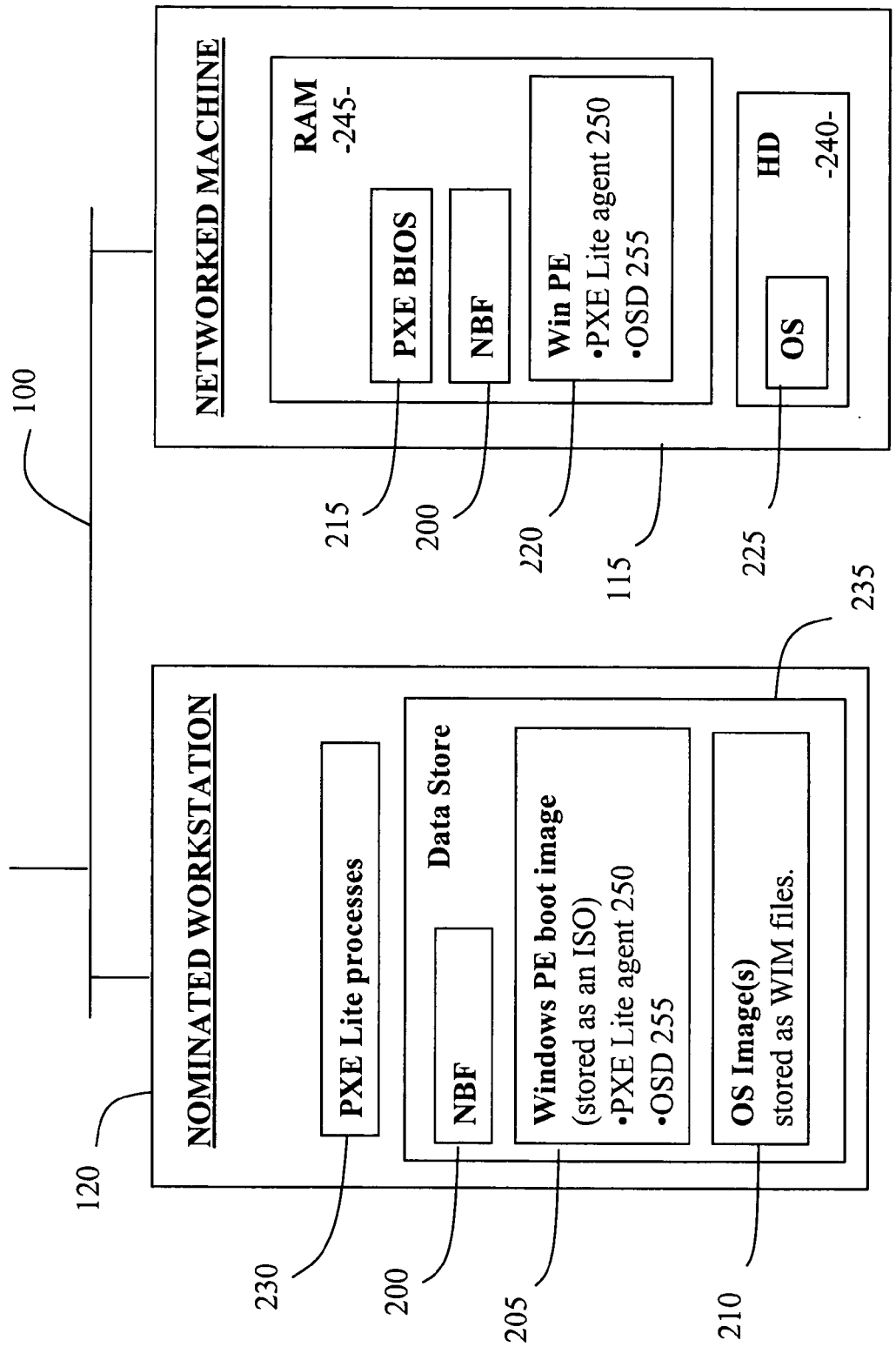
FIG. 2 shows a functional block diagram of processes present on a workstation acting a "PXE Lite server" and on a machine booting from a bare metal state, both connected to the sub-network of FIG. 1.

Referring to FIG. 2, in order to play its part in booting a bare metal machine 115 and installing an OS 225, the workstation 120 designated as the PXE Lite server has present on it, or available to it in the sub-network:

PXE Lite processes 230
a network boot file 200
the Windows PE boot image 205 (stored as an ISO and containing some components of OSD 255, together with the PXE Lite Agent 250)
the OS Image(s) 210, stored as WIM files.

"ISO" is an informal term for an image file containing an ISO-9660 file system, this being the format commonly used on CD-ROM media. More information is available at http://en.wikipedia.orp/wiki/ISO_image.

The role of the designated workstation 120 and the PXE Lite processes 230 is effectively to make a network boot file 200, Windows PE boot image 205 and the OS image(s) available to the booting machine 115. The manner in which the files are made available is further described below with reference to FIGS. 3 to 9 and the nature of the PXE Lite processes 230 is detailed below with reference to FIG. 10.

During a boot process from "bare metal" according to an embodiment of the invention, a machine 115 will be configured with the following software and supporting information:
 PXE BIOS 215 (present on the bare metal machine 115)
 a network boot file 200 (obtained from the designated workstation 120)
 Windows PE pre-installation environment 220 (obtained from the designated workstation 120), extended to include:
  PXE Lite agent 250
  components of OSD 255

These are stored in RAM 245 on the booting machine 115 and their overall role is to install a full operating system 225 with its image to the hard disk 240. That is, when a bare metal machine 115 first starts up, a network boot file 200 is downloaded thereto and used to trigger booting a copy of Windows PE pre-installation environment 220 over the network. The PXE Lite Agent 250 and OSD components 255 of the pre-installation environment 220 are then responsible for deploying an OS image 225 (installing it) to the local hard disk of the machine 115. When this is complete, the PXE Lite Agent 250 exits, causing Windows PE to exit, in turn causing the machine 115 to restart. At this point, the machine 115 boots into the locally-installed operating system 225.

It will therefore be appreciated that the PXE BIOS 215 is present on the bare metal machine but the agent 250 and OS 225 have to be obtained and run (booted) using an embodiment of the present invention.

Windows PE Boot Image 205

As will be described in detail below, the network boot file 200 is obtained from the workstation 120 and subsequently used to boot the bare metal machine 115 to a copy of the Windows PE boot image 205 provided by the workstation 120 designated as the PXE Lite server. The OSD components 255 contained by the Windows PE boot image 205 are of known type for use in deployment of operating systems, such as the local components of OSD Plus Pack mentioned above. In a particular embodiment, the components include the following:
 i386\SYSTEM32\OSDInstallWizard.exe
 i386\SYSTEM32\OSDInstallCD.exe
 i386\SYSTEM32\OSDShell.exe
 i386\SYSTEM32\OSDSHELL.INI
 i386\SYSTEM32\OSDENV.EXE
 i386\SYSTEM32\WINPESHL.INI
 i386\SYSTEM32\RIPINFO.INI These components are taken from the content of the image installation CD that the regular OSD process creates. It will be understood however that the specific OSD components may be varied or replaced, depending on the operating system deployment processes to be supported. Different components would be used for example in supporting Windows Vista.

The PXE Lite agent 250 contained by the Windows PE boot image 205 comprises a set of component files as follows:
 i386\SYSTEM32\PXELiteAgent.exe
 i386\SYSTEM32\PXELiteAgent.ini
 i386\SYSTEM32\PXELiteReset.exe
 i386\SYSTEM32\winpe.bmp—this is a replacement wallpaper bitmap containing a 1E PXE Lite logo. Customers can replace this with their own image if they so desire.

These files are stored as ordinary files on a server, such as the server 130 with the PXE Lite Administrator Console 132 installed on it, from where they are added to the ISO to be made available to the workstation 120 and thus to a booting machine 115.

When the bare metal machine 115 boots to the Windows PE boot image 205, the PXE Lite Agent 250 is caused to run and execute the following steps:

1. At startup, Windows PE starts WINPESHL.EXE which performs various initialisation functions.
2. It then looks in WINPESHL.INI for the name of the program to start next. OSD designates OSDSHELL.EXE.
3. OSDSHELL.EXE performs further OSD initialisation, then looks in OSDSHELL.INI for the name of the program to start next.
4. By default, this would be OSDInstallCD.exe but in embodiments of the invention this has been overwritten as PXELiteAgent.exe to provide a point where the PXELiteAgent.exe program is "hooked" into the boot process Once PXELiteAgent.exe is running, the OSD parameters can be set up as described below in relation to FIGS. 6 to 9, whereafter OSDInstallCD.exe runs, which continues with the OS installation process in known manner. While PXELiteAgent.exe is running, it is a file called PXELiteAgent.INI which names the program to be run next. PXELiteAgent.INI also defines a variety of configurables such as timeouts, etc. In particular, the PXE Lite Agent 250 populates the following variables:
OSDINSTALLSILENT=−1
OSDTARGETDRIVE=C:\
OSDLOCALDATAPATH=C:\MININT\SMSOSD\
OSDLOGPATH=C:\MININT\SMSOSD\OSDLOGS\
OSDSTATEPATH=C:\MININT\SMSOSD\StateStore
_OSDINSTALLSTARTED=−1
OSDNEWMACHINENAME=<the chosen name for the new machine>
OSDPACKAGEPATH=<the fully-qualified UNC path to the SMS package>
OSDPROGRAMID=<the name of one of the SMS programs in that package>
OSDCONFIGPATH=<the fully-qualified UNC path to the SMS package>\<the name of one of the SMS programs in that package>\SMSDeploy.xml
_OSDRESERVED1=<encrypted user credentials for accessing the UNC path to the SMS package>

The PXELiteReset.exe program is run as a post-install OSD step; it is responsible for calling the SOAP method call "NotifyInstallationComplete" which updates the database 135 when the installation has completed.

The UNC ("Uniform Naming Convention") path to the SMS package is the path to the SMSNomad cache containing the WIM file (and various other OSD components). The encrypted user credentials are read from RIPINFO.INI (a file which originally came from the OSD Image Installation CD, but is now present in the WinPE+OSD+PXELite ISO file). In RIPINFO.INI, the encrypted user credentials are stored as three separate values, generated when an OSD Image Installation CD is originally created. These values are concatenated, using a comma to separate each value, as <Reserved1>,<Reserved2>,<Reserved3>and placed in the "_OSDRESERVED1" variable.

In addition, the PXE Lite Agent 250 populates the following two variables, which are used for communication between the PXELiteAgent.exe program and the PXELiteReset.exe program:
PXELITECONFIGSERVER=<full URL to the web service>
PXELITEMACADDR=<MAC address of the machine's network card>

The full URL to the web service would be something like http://server/OSDPlusPack/PXELiteConfiguration.asmx. This is the discovered location of the configuration server, as advertised by the workstation 120 designated to be a local "PXE Lite Server", and is the first item of network communication initiated by the PXE Lite Agent 250; use of these data is further described below with reference to FIG. 6, in the description of STEPS 10 and 11.

The MAC address is used to identify this machine in the database. It is necessary to ensure that PXELiteAgent.exe and PXELiteReset.exe use the same MAC address in the case where a machine has more than one available network card.

In practice, communication between the PXE Lite Agent 250 and the OSD process 255 is facilitated by an environment object named "OSD Environment" which is implemented in the OSDENV.EXE file mentioned above. This is a table comprising (name, value) pairs and is configured such that a name appears no more than once and has a particular value associated with it. The OSD Environment object is documented in the Microsoft Operating System Deployment ("OSD") Feature Pack mentioned above.

Boot Processes

Referring to FIGS. 3 to 9, various processes available in booting a machine 115, 116, 120, 121, 122 connected to a sub-network will now be described. Some scenarios that might arise are as follows:
- an existing machine is starting up which already has an installed operating system and thus does not need to boot from the network;
- a new machine is starting up for the first time, in which case it carries only the PXE BIOS 215 and needs to be booted to the Windows PE pre-installation environment 220 over the network, including the PXE Lite Agent 250, in order to install an operating system 225 to its hard disk. It might be planned that the operating system is designated centrally or can be selected locally;
- an existing machine has suffered corruption of its hard disk and consequently needs to be re-installed;
- a new OS installation is about to be deployed.

These scenarios can be dealt with primarily by a boot status value held in the "NextAction" field of the database 135 in relation to the machine starting up. The boot status value can be set in the database for any machine automatically as a result of a current boot status of a specified machine, or as a default value or by operator input. There are five available boot status values, namely ignore, boot-to-hd, wait, deploy and prompt.

The default boot status values held in the database 135 for a machine 115 in each of the scenarios above will be as follows:
Existing machine with installed OS: either "ignore" or "boot-to-hd"
New machine starting for the first time: "ignore"
Existing machine with corrupted OS: "wait", "deploy" or "prompt"
New machine but new OS version about to be deployed: "wait"

The boot status value can be queried by a nominated workstation 120 (using the database interrogator 1005 of its PXE Lite processes 230, further described below in relation to FIG. 10) in relation to a machine 115 on its sub-network, using the method of the SOAP web service 133 called "Get Boot Action", and by the PXE Lite Agent 250 present on the machine 115 using the method "Get Agent Action". These two methods will return the values shown below:

TABLE 1

| | values returned by SOAP methods | |
|---|---|---|
| Boot Status Entry | Method GetBootAction returns | Method GetAgentAction returns |
| ignore | ignore | reboot |
| boot-to-hd | boot-to-hd | reboot |
| wait | boot-to-agent | wait |
| prompt | boot-to-agent | prompt |
| deploy | boot-to-agent | deploy |

The nominated workstation 120 is first triggered to use the SOAP method "Get Boot Action" when it detects a broadcast message from the PXE BIOS of a machine that is starting up on its sub-network. If the value returned is "ignore", it will do just that. If the value returned is "boot-to-hd", it will supply a network boot file 200 to the machine 115 that exits and causes the machine 115 to boot to its hard disk. If the value returned is "boot-to-agent", the nominated workstation 120 will deliver Windows PE and cause the machine to boot to the PXE Lite agent 250. In this case, the agent 250 will then use the SOAP method "Get Agent Action". At this point, the nominated workstation 120 will receive a value which relates to installation of an operating system and might be any of the values "wait", "prompt" or "deploy". There is also a value "reboot" available to the SOAP method "Get Agent Action" that deals with a situation in which the agent 250 has been incorrectly run when the boot action should have been "ignore" or "boot-to-hd".

Before a new machine has started up for the first time, it is unknown to the database 135. A default boot status value is set in the database 135 which is "ignore". In practice, this might be reset to one of the values that will cause the SOAP method "Get Boot Action" to return the value "boot-to-agent" but the actual value chosen will depend on real-time circumstances and can either be set as the permanent default, using the "Settings" table 300 of the database 135, or can be configured directly in the "Computers" table 300 for instance by making an entry based on the MAC address of the new machine 115.

Boot Action: Ignore

Referring to FIG. 3, the simplest situation is one in which the boot status value set in the database 135 is "ignore". For example, this will be the case where a machine 115 has previously network booted and has a current version of an operating system already installed. Steps in a boot process that will occur are as follows:

Step 1:

When a machine is configured to PXE-boot, it always attempts to discover the location of a boot server and the name of a boot file. The PXE BIOS software is present on any PXE-enabled machine 115 and ensures that its network interface card will automatically broadcast a DHCPDISCOVER message to the sub-network 100 that will go beyond the router 110 and via the WAN 105 to the DHCP server 125. Because the machine 115 also identifies itself as a PXE machine, by using a PXE-defined optional extension to the DHCPDISCOVER message, it will also be detected by the workstation 120 nominated as the PXE Lite server.

The DHCPDISCOVER message sent by the machine 115 includes a MAC (Medium Access Control) address. The MAC address is unique and can be used to identify a booting machine where there is no network address, such as an IP (Internet Protocol) address. However, the DHCPDISCOVER message according to standard practice also contains a randomly generated number known as the "Transaction ID". When a DHCPOFFER packet is broadcast in response, the machine 115 can identify it as it will contain the same Transaction ID.

Step 2:

The DHCP server 125 will return a DHCPOFFER message, offering a value for a network address. This will not however offer values for options "#66" and "#67" which the PXE BIOS of the bare metal machine 115 is expecting. Values for these options provide the location of a boot server and the file name and path for a boot file.

Step 3:

Meanwhile, the workstation 120 designated as the PXE Lite server uses a SOAP method "Get Boot Action" to query a web-based service 133 of a company intranet to access the boot state database 135 which maintains state information in relation to the boot process for all machines 115, 116, 120, 121, 122 connected to the sub-network 100 which have attempted to PXE boot. To query the database 135, the workstation 120 will use the MAC address of the newly started machine 115. In particular, it will access the "NextAction" field of the table "tb_PXELite_Computers".

In the scenario being described, the machine 115 already has an operating system installed and the database 135 therefore has a row of values against its MAC address. However, if the machine 115 were a bare metal machine, before STEP 3, the database 135 would have no knowledge of it. On receiving the query, a new record would be opened in the database 135 based on the machine's MAC address.

Step 4:

In response to the SOAP-based query, the database 135 returns the value "ignore" to the workstation 120. The workstation consequently makes no response to the machine 115.

Steps 5 and 6:

Having received an offer from the DHCP server 125 in STEP 2, the PXE BIOS software on the machine 115 can request an IP address from the DHCP server 125. It has not however received an offer message from either the DHCP server 125 or the nominated workstation 120 containing values for options "#66" and "#67" and thus cannot obtain a boot file 200 via the network. The PXE BIOS software on the machine 115 will continue asking for these until it times out, usually at around thirty seconds. At this point, the machine 115 will go to its next configured boot device, the hard disk, and continue to boot from its hard disk.

If the machine 115 however is a new machine with no operating system on its hard disk, booting would fail at this point. It is necessary for the status value in the database 135 for the machine to be reset to "wait", "deploy" or "prompt". This can be done for example from the sub-network using a graphical user interface ("GUI") of the nominated workstation 120, or more preferably centrally from the PXE Lite administrator's console 132. The next time the machine 115 is started and broadcasts a "DHCPDISCOVER" message, the SOAP method "Get Boot Action" will return the value "boot-to-agent" (in response to the value in the "NextAction" field of the table "tb_PXELite_Computers") and steps described below in relation to FIGS. 5 to 9 will ensue.

Boot to Hard Disk

Figure 4:
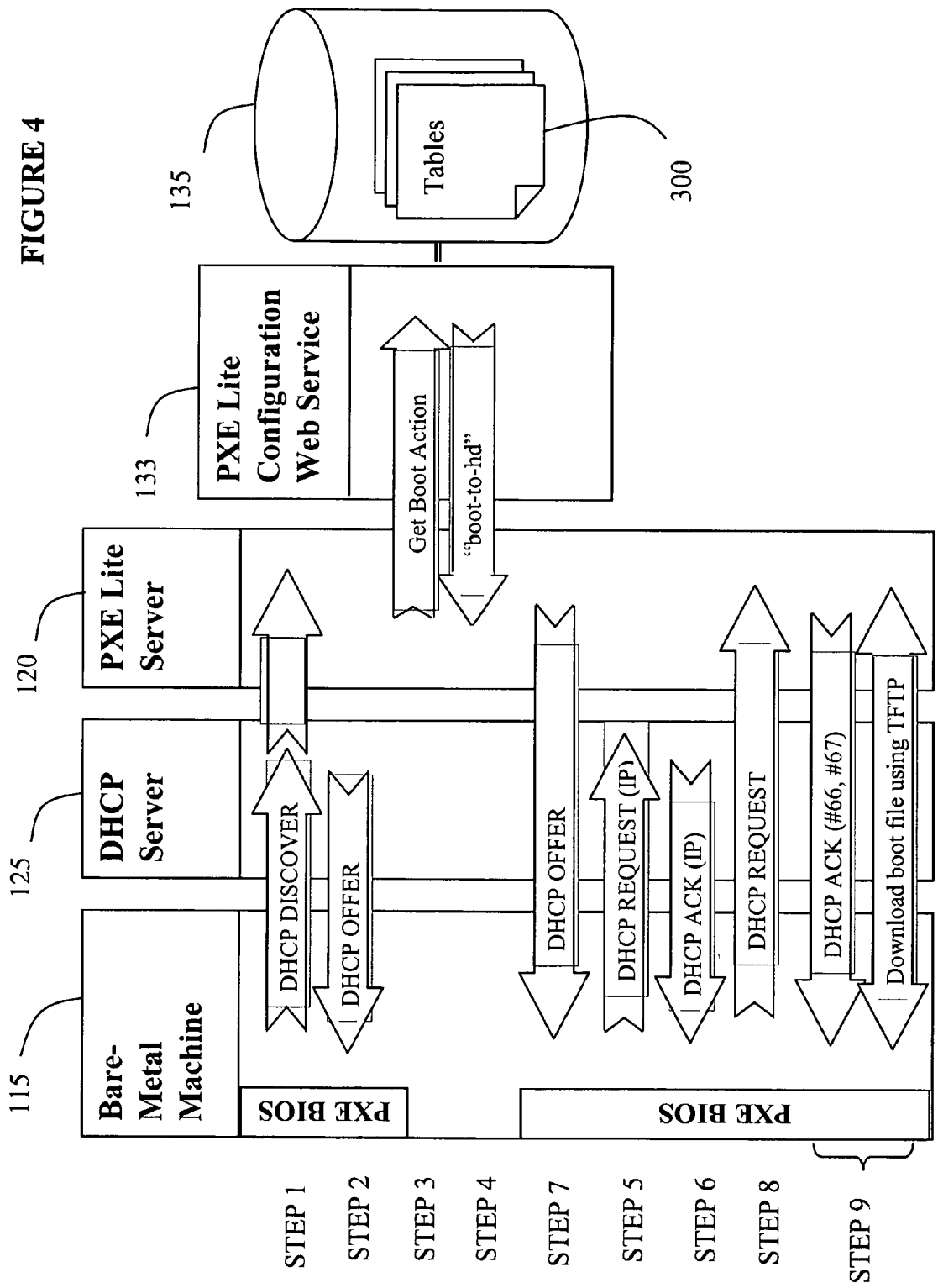

Referring to FIG. 4, an alternative approach to booting the machine 115 to its hard disk is to load a network boot file 200 according to the following procedure:

Steps 1 to 4:

These are repeated as above except that the value returned to the nominated workstation 120 in STEP 4 is "boot-to-hd".

Step 7:

The nominated workstation 120 now returns a DHCPOFFER message to the machine 115 including values for options "#66" and "#67".

Steps 5 and 6:

Repeated as described above.

Step 8:

The PXE BIOS software now sends a "DHCPREQUEST" message to the IP address of the nominated workstation 120 which the workstation 120 will respond to.

Step 9:

The nominated workstation 120 responds by sending a DHCPACK message including values for options "#66" and "#67". The network boot file 200 identified here is "STARTROM.F12" which is a known network boot file that offers a prompt to a user via the GUI of the booting machine 115 to key "F12" in order to network boot. The PXEBIOS software uses the known "trivial file transfer protocol" (TFTP) to download the network boot file 200 from the workstation 120 and the file 200 then executes, locally. If the user ignores the prompt, the network boot file 200 times out, for instance at five seconds, and the machine 115 will boot from its next configured boot device which is the hard disk.

If the user keys F12, the machine 115 will boot from the network 100, causing it to load Windows PE and the PXE Lite agent 250 as described below with reference to FIG. 6. When the agent 250 loaded on the machine 115 subsequently queries the database 135, it will get the boot action "boot-to-hd" and will immediately exit, leaving the machine 115 to boot from its hard disk. As an alternative "STARTROM.F12" can be replaced with a network boot file 200 that exits immediately without offering a prompt.

Boot to Agent

If an operating system (re-)installation is required, for instance because the machine 115 is broken or because a new release of the OS is available, an administrator will cause the status entry in the database 135 for that machine 115 to be set to "wait", "prompt" or "deploy" such that the next time the machine is turned on, the machine 115 boots to Windows PE 220 and the PXE Lite Agent 250.

Figure 5:
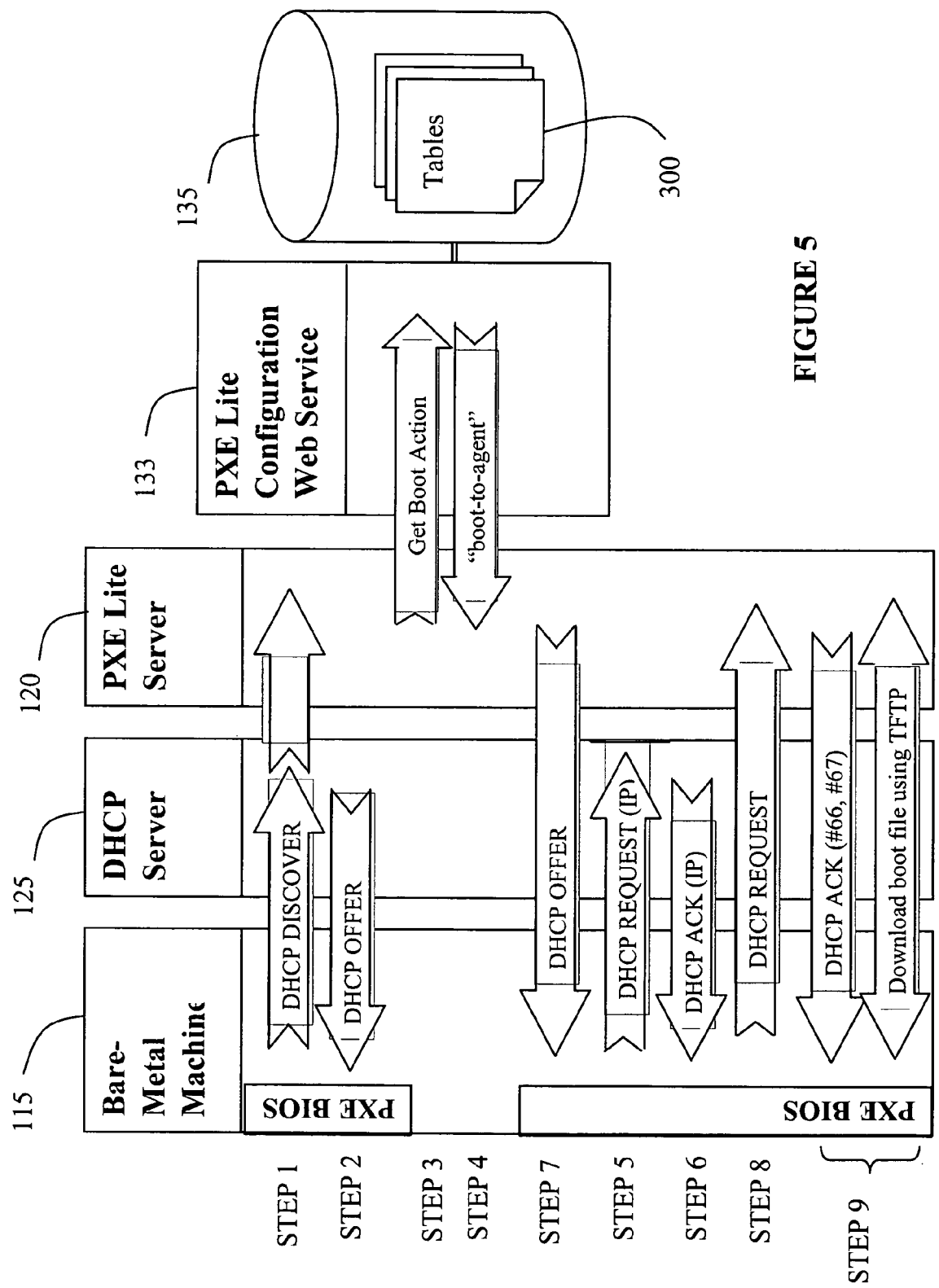

Referring to FIG. 5, in the case that a machine 115 needs to install an operating system from the network, for instance because it is a bare metal machine or because its existing operating system has been corrupted, all of the steps of FIG. 4 will be repeated except that instead of "boot-to-hd", the SOAP method "Get-Boot-Action" will return the value "boot-to-agent" in response to the content of the NextAction field. This is because the NextAction field of the database 135 will now show a status value for the machine 115 which is "wait", "deploy" or "prompt". This may have been set as a default value or by configuration. Furthermore, the network boot file 200 identified in the DHCPACK message from the nominated workstation 120 to the machine 115 will now be "STARTROM.N12", identifying another known network boot file 200 which, when executed, has the effect of loading Windows PE into random access memory (RAM) in the machine 115 using TFTP, this including the PXE Lite agent 250.

Figure 6:
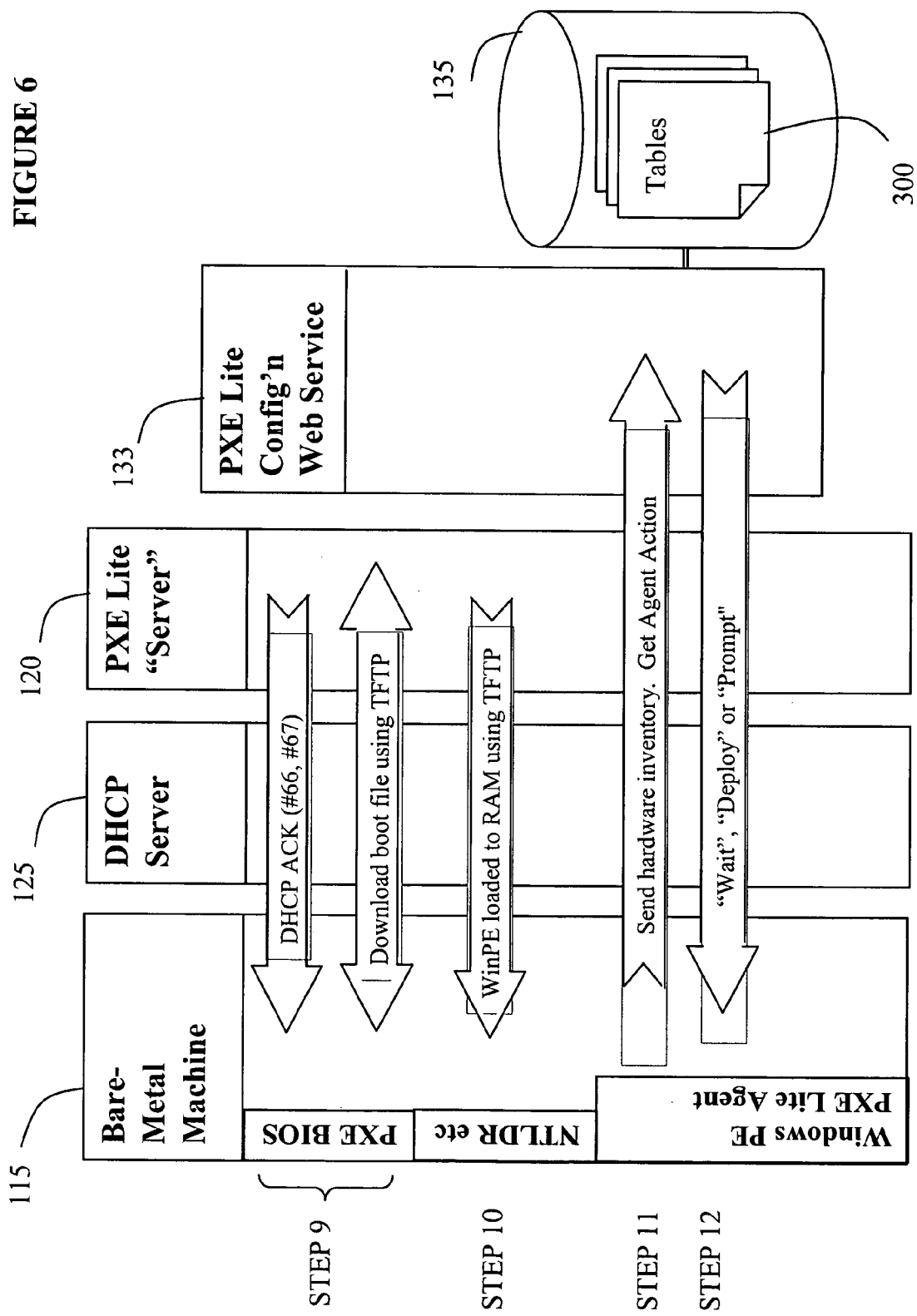

Referring also to FIG. 6, in more detail, once STARTROM.N12 is loaded and running, it can load and run NTLDR and NTDETECT.COM files. These are known components of Microsoft Windows NT operating systems that operate on an x86 architecture. The NTLDR (standing for "NT Loader") file loads various drivers and system files into memory while the NTDETECT.COM file is used during the Windows NT Startup Process, and is responsible for detecting basic hardware that will be required to start an operating system. "STARTROM.N12" also reads the WINNT.SIF file via TFTP, this file telling it where it can find the ISO file for loading into a RAM disk. The RAM disk is mounted as "X:". At this stage, Windows PE can boot up, the TFTP part of the boot process is complete and control is handed to the PXE Lite agent 250 which was included in the Windows PE image—the ISO file.

In practice, a "wizard" utility is provided to step the user through the process of combining the various Windows, OSD and PXE Lite files, and of creating the ISO file.

The steps shown in FIG. 5 are not further described herein.

Get Agent Action

FIGS. 6 to 9 show sequences of events from and including STEP 9: delivery of the network boot file "STARTROM.N12" to the machine. The subsequent steps depend on the status value held by the database 135 for the machine 115.

Referring to FIG. 6, a first sequence of events occurs regardless of which of the three status values is held, whether "wait", "deploy" or "prompt":

Step 10:

The PXEBIOS software 215 loads Windows PE from the workstation 120 to the machine 115 using TFTP, this including the PXE Lite Agent 250 (and any necessary parts of OSD software 255).

Step 11:

The agent 250 executes, first running a data reader/writer to obtain and send a hardware inventory of the machine 115 for storage in the table 300 called "tb_PXELite_HardwareInventory" at the central database 135 and then using the SOAP method "Get Agent Action" to obtain a value from the database 135. The hardware inventory is hardware data identifying hardware at the machine 115 that might affect the selection of the operating system to be installed.

In order to use the SOAP service 133, the PXE Lite Agent 250 needs to locate it and the server 130 on which it sits. To do this, between STEPS 10 and 11, the agent 250 broadcasts a "configuration server location request package" to which the workstation 120 designated as the local PXE Lite "Server" responds (non-broadcast) with the URL to the configuration server SOAP endpoint.

Step 12:

The database 135 returns the appropriate agent action value, selected from "wait", "deploy" or "prompt".

Figure 7:
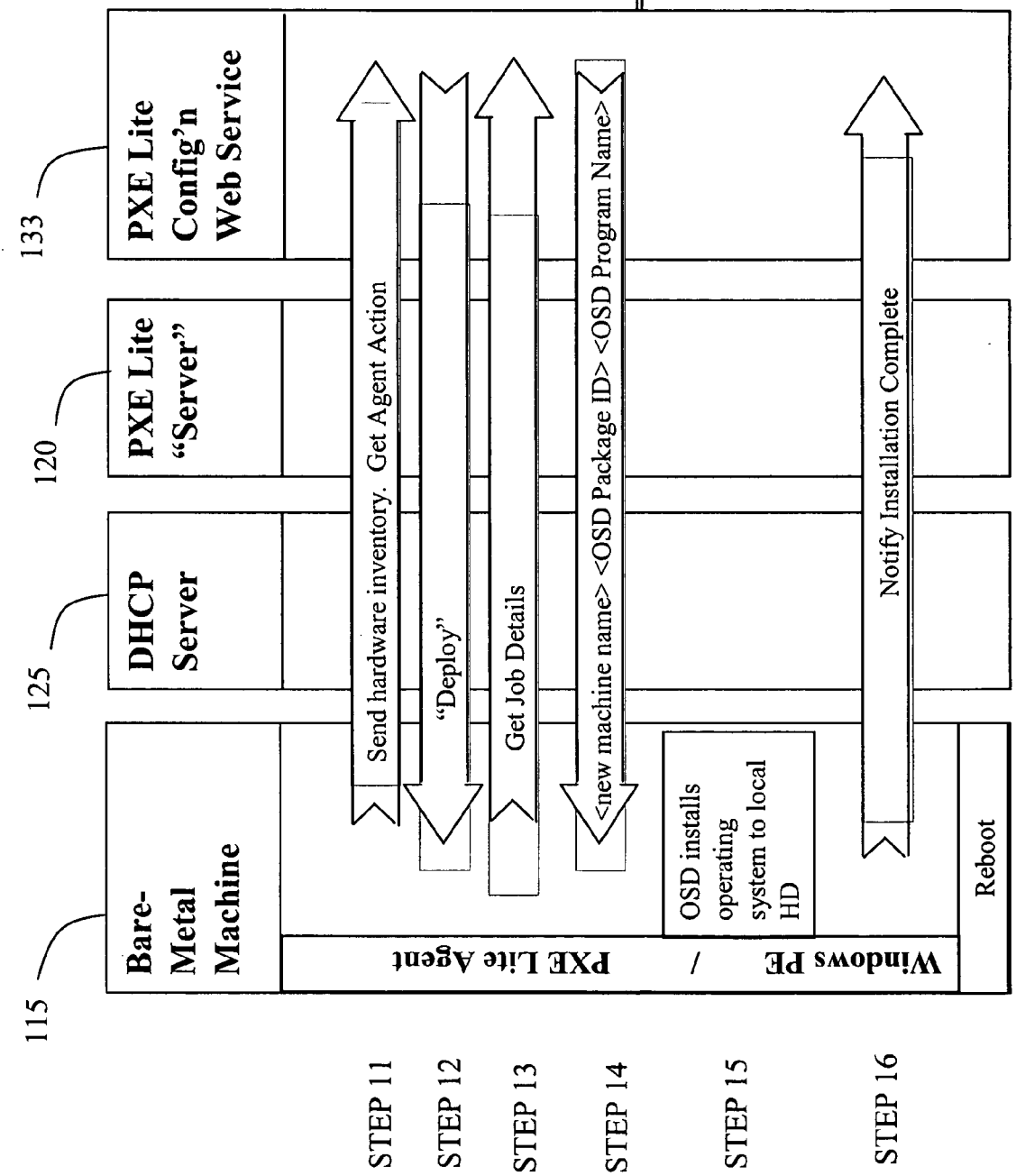
Figure 8:
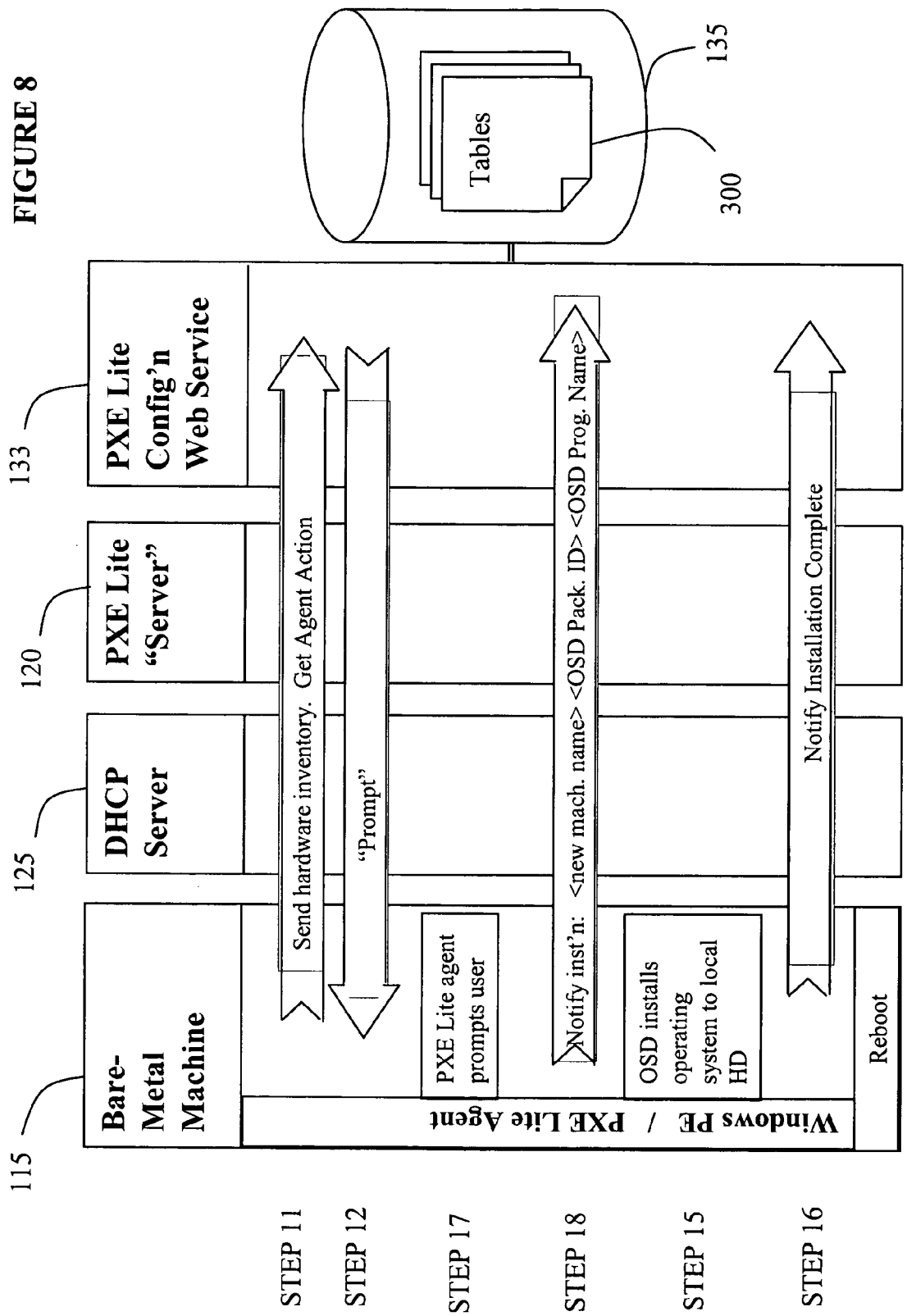
Figure 9:
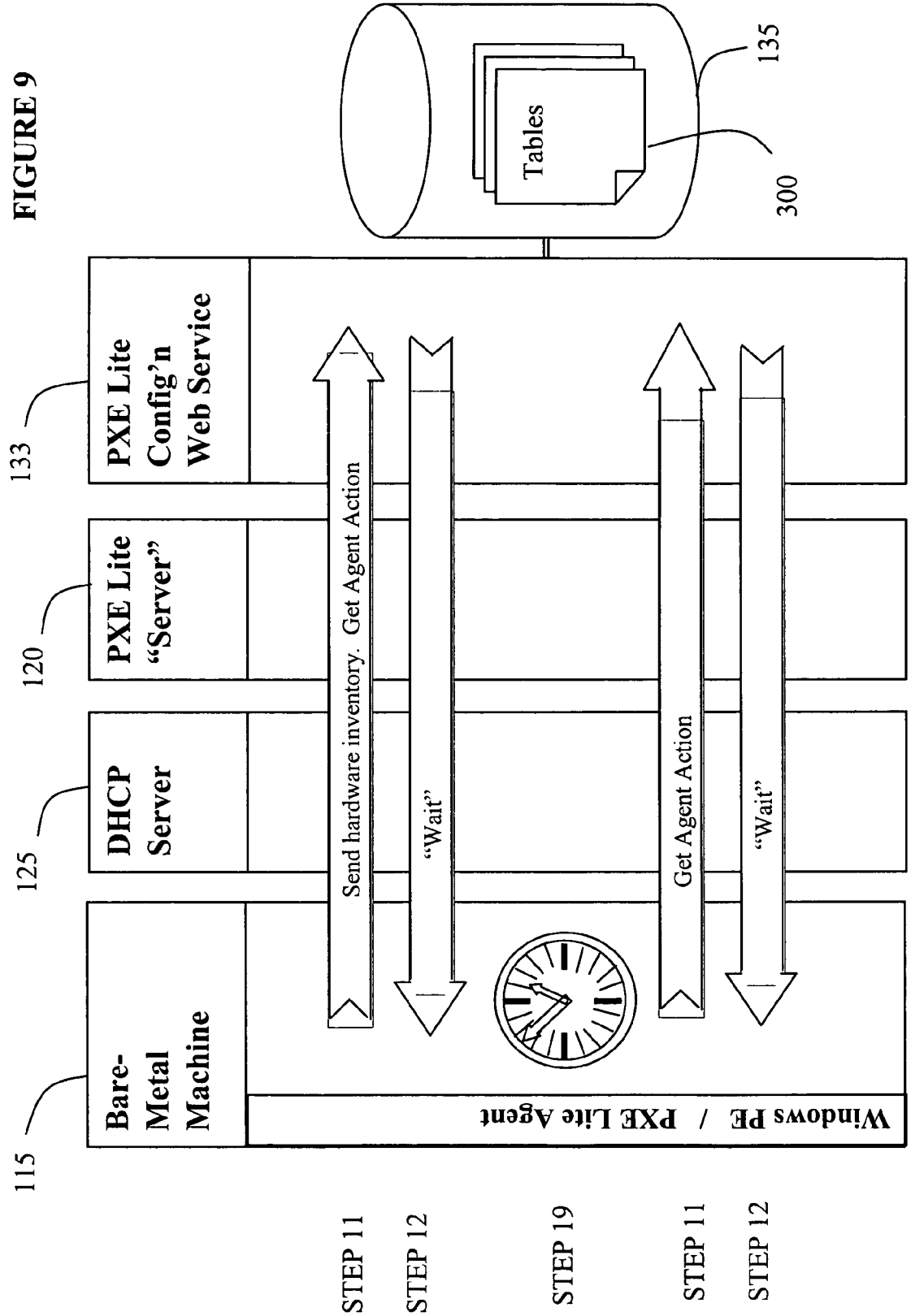

Each of FIGS. 7, 8 and 9 shows STEPS 11 and 12 as above.

It might be noted that in practice an agent action in this context is an action in relation to installing an operating system.

Agent Action: Deploy

Referring to FIG. 7, if the agent action value returned by the database is "deploy", it is the intention that the PXE Lite agent 250 should now download an operating system from the network.

This option applies where an operating system has been copied to a location on the sub-network 100 using SMS Nomad and assigned to the bare metal machine 115. The "deploy" option allows the agent 250 to take the OS image (WIM) details from the database 135 and pass them to the OSD system which will respond by installing the new operating system on the machine 115. The boot action option that will subsequently be found by the workstation 120 is then set to a post-installation default which might be "ignore" or "boot-to-hd".

The nature of that operating system will depend in part on what has been distributed to or via the nominated workstation 120. However, in an additional level of flexibility, it may also depend on the nature of the machine 115 being booted.

Step 13:

The PXE Lite agent 250 queries the database 135 using the SOAP method "GetJobDetails". The "GetJobDetails" call contains the new machine name plus the package ID and the program name of the OSD image installation for which the agent 250 requires values.

STEP 13 could in practice be omitted and the job details returned by the database 135 together with the value "deploy". However, although this eliminates a round trip in terms of signalling across the network 100, 105, it would complicate the web service interface 133.

Step 14:

The database 135 returns values for the machine name, an OSD package ID and an OSD program name. These values are stored at the database 135 in the table 300 called "tb_PXELite_Jobs" and may be determined at least in part by hardware data stored in the table 300 called "tb_PXELite_HardwareInventory", having been supplied by the machine 115 in STEP 11. The values for the OSD package ID and program name are also available via the PXE Lite administration console 132 and can thus be set or adjusted by an administrator who can then decide which image to deploy to a particular machine.

The assignment of values in "tb_PXELite_Jobs" for a machine 115, 116, 120, 121, 122 or a group of machines can be done automatically, using extensibility features of the database 135 to run custom database scripts and triggers in known manner, or it can be done manually via the PXE Lite administrative console 132.

Step 15:

The OSD components of the Windows PE software install the operating system to the hard disk of the machine 115.

Step 16:

The PXE Lite agent 250 notifies the database 135 that installation is complete, this updating values for both "NextAction" and "Status" in the row for the relevant machine 115 in the table 300 called "tb_PXELite_Computers" of the database 135. This is done by the PXELiteReset.exe program which is responsible for calling the SOAP method call "NotifyInstallationComplete".

Agent Action: Prompt

Referring to FIG. 8, if the agent action value returned at STEP 12 by the database is "prompt", it is the intention that an operator should be able to select the operating system to be loaded, at the machine 115 itself. This involves local manual entry of the operating system image details, and is in contrast to the administrator entering the details centrally, as in the "wait" and "deploy" circumstances. If, when the PXE Lite Agent 250 polls the database 135, the agent action value returned is "prompt", it brings up a dialog box, prompting someone locally (i.e. sitting in front of the new machine) to enter the operating system image details. This information is entered into the database 135, in case the machine 115 should reboot while installing the image, and then image installation continues as above, using Microsoft's OSD. Again, when it completes, the next boot action for the machine is reset in the database 135 to either "ignore" or "boot-to-hd".

Step 17:

The PXE Lite agent 250 triggers a prompt to the graphical user interface of the machine 115 and the operator enters the data that would have been provided by the database 135 in STEP 14 in an automated OS deployment.

Step 18:

The operating system data entered by the user, including a new machine name, ID and program name for the operating system to be deployed, needs now to be notified to the database 135. The prompted-for information is sent by using a "NotifyInstallationStarting" SOAP method. It is inserted into the "tb_PXELite_Jobs" table 300 just as it would have been by one of the options described earlier, either in accordance with the content of the "tb_PXELite_HardwareInventory" table 300 or by means of the PXE Lite administration console 132. The information is useful both for progress/status reporting and for resuming installation if the machine 115 reboots.

In practice, it would be possible for this prompt mechanism to be simplified for the user. Instead of entering operating system location data, it would be possible for the user to enter a higher level of information such as the category of operating system, for example "Finance" or "Human Resources". The PXE Lite agent 250 could then use this information to query the database 135 for the identity and program name for the operating system to be deployed.

It might be noted here that it is possible to replace or enhance the functionality of the PXE Lite agent 250 by incorporating custom scripts and/or applications to run in Windows PE 220. Thus the prompt mechanism could be used to ask the user for extra information, such as region or business unit, and Windows PE 220 could then upload that information to a different location and/or database, for example for auditing purposes.

In the case of either "deploy" or "prompt", the operating system image details that will be relevant to embodiments of the present invention are as follows:

an SMS package identifier ("ID") of the operating system image.

an SMS program name. This allows other configuration of the newly-installed image, among other things.

the name of the newly-created machine 115.

These details constitute operating system identification data sufficient for the new operating system to be found and installed on the machine 115 by operating system installation apparatus represented by the PXE Lite Agent 250 together with Microsoft's OSD.

Once the image details have been retrieved from the database 135 (or entered by the local user), these are provided to Microsoft's OSD, which starts the installation. In order to use OSD in a branch scenario, the machine 115 must be provided with the path to an SMS package, rather than just an identifier therefor. This path is provided as a UNC path. In order to discover the path, the PXE Lite agent 250 broadcasts a package location request on the sub-network 100 which contains the ID of a desired package. The nominated workstation 120 where the package is stored responds by sending back (preferably not broadcasting) the UNC location of the package and this is passed to the OSD components of the Windows PE pre-installation environment 220.

Agent Action: Wait

Referring to FIG. 9, if the agent action value returned at STEP 12 by the database is "wait", it is the intention that the machine 115 should not begin installing an operating system image without further instruction, this being embodied as a change in the database 135. For example, this might be appropriate behaviour where new machines 115 are delivered to a "build lab" where the machine will be connected to a network and turned on but must await an administrator or other authority before an image can be installed. In this scenario, the default action is set to "wait" which causes all the machines 115 to boot to Windows PE and the PXE Lite agent 250 and then to await further instructions.

Steps 11, 12 and 19:

The PXE Lite agent 250 will periodically poll the database 135 to find out what it should be doing, using the web service 133 mentioned above. Primarily it is waiting for entries in the database to change, these being configurable for each machine 115 for instance via the PXE Lite administration console 132. The boot action may be changed to "ignore" or "boot-to-hd", in which case the agent 250 exits, causing Windows PE to exit and causing a reboot. However, if the boot action changes to "prompt" or "deploy", the steps shown in FIGS. 7 or 8 and described above will apply.

Flexibility

The use of the database 135 offers two levels of flexibility: a first in terms of how a machine 115 boots up, whether from the network or from its hard disk, and a second in terms of installing a new OS. The first level of flexibility is provided whenever a machine first switches on and the database content returns a boot action value "ignore" or "boot-to-agent".

"Ignore" means that the machine 115 will be ignored by the PXE Lite system, and is typically returned when the machine 115 has an up to date operating system installed thereon: thus a booting machine 115 only has to boot from the network 100 once. Thereafter it will boot to its own hard disk until the operating system is changed or perhaps the machine needs re-installing. Alternatively, a user may wish to choose an operating system delivered otherwise than by PXE Lite, for instance from a CD, and will have set the boot action value to "ignore". It will often be preferable that a PXE Lite system has "ignore" set as the default boot action as it is the least intrusive of the available settings.

The second level of flexibility is provided when a machine 115 is going to have to boot from the network 100 and thus the boot action is "boot-to-Agent". The PXE Lite agent 250 on the booting machine 115 will now query the database 135 and may get the agent action returned as "wait", "deploy" or "prompt". These agent action values cater for the following respective situations:

OS installation pending but not available

OS installation already assigned centrally

OS to be determined at sub-network level

The selection of an assigned OS image may be done according to rules or policies 1205 and this supports increased automation. Examples of possible rules 1205 are:

Rule Example 1: if the machine hardware is such that it requires a specific image in order to operate for example a different hardware abstraction layer (HAL) then the assignment of OS image can be calculated based on specific hardware inventory information identified by the data reader of the PXE Lite agent 250 and transmitted to the database 135 in STEP 11 described above.

Rule Example 2: If OS image assignments had been pre-defined centrally against a unique machine identifier, for example MAC address, all future deployments would be aware of the OS image assignment.

The rules 1205 might ensure consistency. For instance, if some of the machines 115 already have an assigned OS image of a particular type, such as a finance-based OS image, then upgrades in finance-based images will only be booted to those machines. This will also have a consequence in the "NextAction" field of the database 135 which will be set to the boot action "ignore" for these machines until there is a change in the finance-based OS image.

As mentioned above in relation to STEP 14, the assignment of values in one or more tables of the database 135 for a machine 115, 116, 120, 121, 122 or a group of machines can be done automatically, using extensibility features of the database 135 to run custom database scripts and triggers in known manner, or it can be done manually via the PXE Lite administrative console 132. As shown in FIG. 12, the rules 1205 can potentially be implemented as one or more policies installed via the PXE Lite administration console 132 which will control entries to the database 135 and thus the booting behaviour of each machine 115, 116, 120, 121, 122. Alternatively, an administrator or user can interface directly with the database 135 to implement one or more policies or rules 1205, in which case the rules or policies 1205 are embodied simply in the content of the database tables 300.

Figure 10:
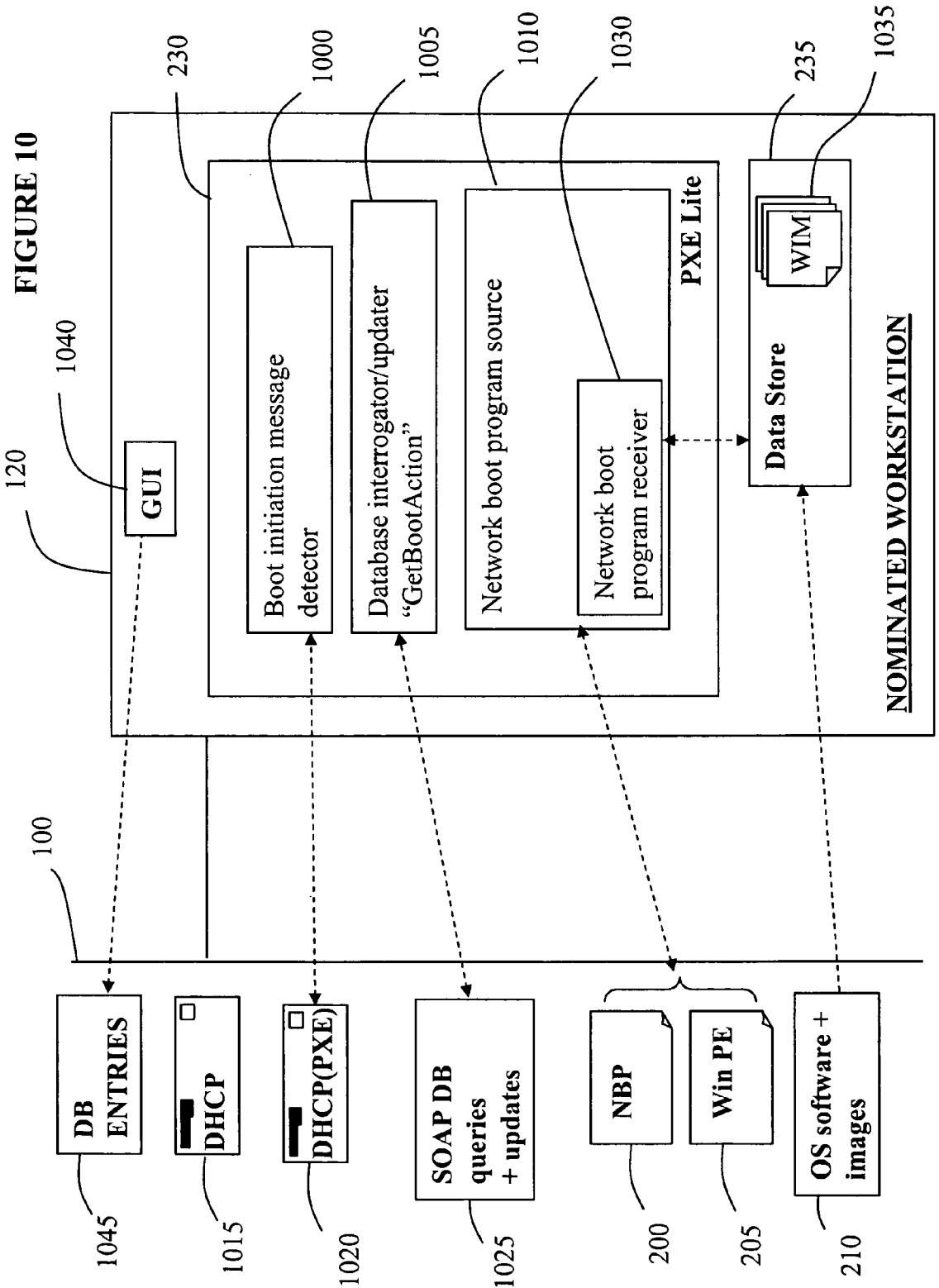
FIG. 10 shows inputs and outputs of a workstation as shown in FIG. 2.
Figure 11:
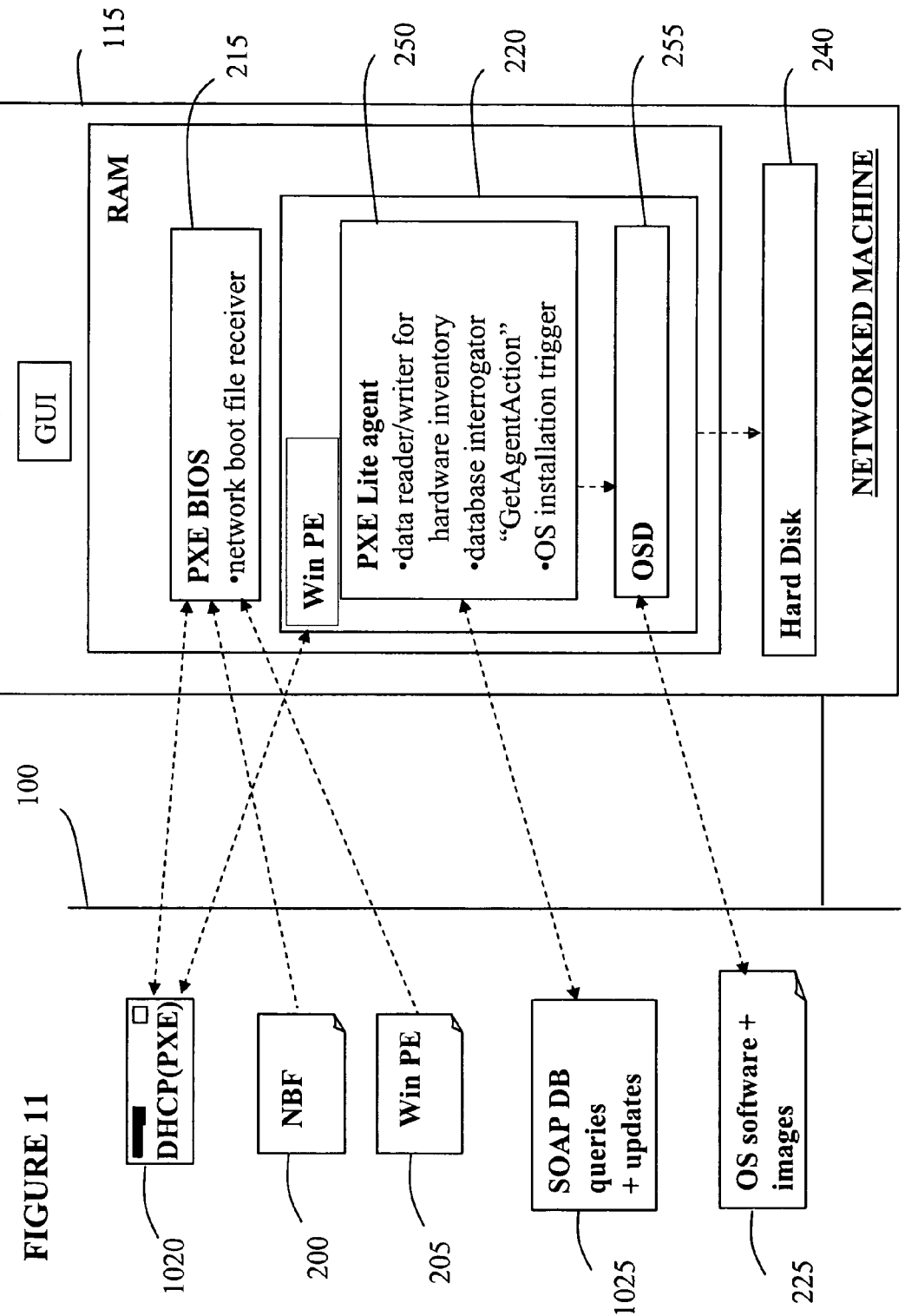
FIG. 11 shows inputs and outputs of a booting machine as shown in FIG. 2.

Referring to FIGS. 10 and 11, inputs and outputs of the nominated workstation 120 and the booting machine 115 during use of the system will now be described.

Referring particularly to FIG. 10, the PXE Lite software 230 installed on the workstation 120 nominated in a sub-network to provide server functions with respect to boot files and images has the following components:

Boot Initiation Message Detector 1000, which detects DHCP(PXE) messages 1020 broadcast on the sub-network 100 while not responding to DHCP messages 1015 which are not PXE-related. Most importantly, it detects the DHCPDISCOVER messages broadcast by a newly started machine 115 on the sub-network 100. It also deals with selecting and sending DHCP-based messages 1020 in response, based on the outcome of queries to the database 135. It therefore triggers Web-based DB queries 1025 to the database 135 and receives and processes the replies;

Database Interrogator 1005, which is run as necessary by the Boot Initiation Message Detector 1000;

Network Boot Program Source 1010, which contains values for #66 and #67, the location of one or more boot servers and the file names and paths for alternative boot files 200, as well as having the ability to respond to a DHCP REQUEST from the PXE BIOS of a machine 115 by supplying selected values in accordance with the boot action data obtained by the database interrogator 1005. The network boot program source is also arranged to store the boot files 200 and is equipped in the manner of a server to respond to a TFTP request from the machine 115 by sending the relevant boot file 200, followed by a copy of Windows PE and the PXE Lite agent 250; and Network Boot Program Receiver 1030, which is provided within the program source 1010 where the network boot files 200 and pre-installation environment 205 are to be stored on and provided from the workstation 120 itself. It enables the boot files 200 and pre-installation environment 205 to be transmitted to the workstation 120, and updated or deleted as necessary, via the sub-network 100. In practice, this might be provided for example by a copy of 1E Ltd's SMSNomad™ which can be used to distribute ISO and WIM files to the workstation 120.

The workstation 120 is also provided with a graphical user interface 1040 for use when the value for a boot action returned from the database 135 is "prompt", and with a data store 235 for storing the boot files 200, such as "STARTROM.F12" and "STARTROM.N12", and Windows PE 205/ the PXE Lite agent 250. If the workstation 120 has also been selected to act as the repository on the sub-network 100 for the operating system images, the data store 235 will also contain the WIM files 1035 themselves.

Inputs and outputs to the PXE Lite software 230 and the data store 235 on the workstation 120, in use, include the following:

DHCP messages 1015, which can be emitted by any newly connecting machine on the sub-network 100. They are ignored if they have no PXE extension;

DHCP(PXE) messages 1020, which are emitted by a newly connected machine 115 are picked up by the boot initiation message detector 1000 of the PXE Lite software 230 on the nominated workstation 120;

SOAP DB queries 1025, which represent the interaction between the workstation 120 and the central database 135 in STEPS 3 and 4 described above, in which the database interrogator 1005 of the nominated workstation 120 obtains a boot action value from the database 135 for a newly booting machine 115 for which it has detected a DHCP(PXE) message 1030;

DB entries 1045, which are entries to the central database 135 available via the nominated workstation 120. The SOAP DB queries 1025 are formatted in a high level language accessible by non-expert users for submission to the database 135 using the SOAP Web service 133 to construct a command in a format the database will respond to. However, it is also possible to set or amend values by interacting directly with the database 135 using database commands in a form to which the database 135 can respond directly, such as in "Structured Query Language" ("SQL") statements where the database 135 is a SQL database. This allows an administrator for instance to change the behaviour of the system in relation to a machine 115 via the sub-network 100 rather than necessarily having access to the PXE administration console 132. It might be noted here that the database 135 is not necessarily a SQL database and could alternatively even be just a collection of simple text files;

NBP 200 and WinPE 205, which represent interaction between the PXE Lite software 230 on the workstation 120 where it has been nominated to act as a server of network boot files 200 and the Windows pre-installation environment 205 comprising the PXE Lite agent 250; and OS Software and Images 210, which are delivered to the workstation 120 only in the event that it is also nominated within the sub-network 100 as the location for the OS images 210. They can be delivered for instance by the known OSD Plus Pack mechanism mentioned above and will be managed at the workstation 120, including for delivery to a booting machine 115, by the network boot program source software 1010.

Referring particularly to FIG. 11, the software which appears in sequence on a newly booting machine 115 on the sub-network 100 is as follows:

PXE BIOS 215, which is of known type. It broadcasts DHCPDISCOVER and subsequent DHCP messages 1020 whenever a machine 115 is newly connecting to the network 100 and it receives and runs software such as the network boot files STARTROM.N12 and STARTROM.F12 200 mentioned above. It also receives and installs the Windows PE software including PXE Lite agent 220, 250 in random access memory; and Win PE including PXE Lite agent 220, 250, which provides the database interrogation shown in FIGS. 6 to 9, and therefore incorporates a further database interrogator having functionality of a type similar to that shown for the workstation 120 in FIG. 10. It runs automatically to ask the database 135 for appropriate agent-related boot actions on which it can act. It can also be used by a user or administrator at the newly booting machine 115 to select a particular image 225 in response to the "prompt" boot action and this selection will be notified by this further database interrogator to the database 135. Further, the PXE Lite Agent 250 incorporates a data reader for reading hardware data from the machine 115 and a data writer for sending data to the database 135.

Inputs and outputs to the newly booting machine 115, in use, are:

DHCP(PXE) messages 1020 (as mentioned in relation to the nominated workstation 120, above);

NBP 200 and WinPE 205 (as mentioned in relation to the nominated workstation 120, above);

SOAP DB queries and updates 1025, which represent the interaction between the newly booting machine 115 and the central database 135 in STEPS 11 to 14, 16 and 18 described above, in which SOAP-based methods of the PXE Lite agent 250 constitute both a database interrogator and a data writer for the machine 115 in order to obtain various values from the database 135 and to supply to the database 135 a hardware inventory for the machine 115, together with updates in respect of the machine and boot process status; and OS Software and Images 210, which are delivered to the machine 115 under the control of the nominated workstation 120 once it has obtained identification data from the central database 135.

Updates to the Database 135

Figure 12:
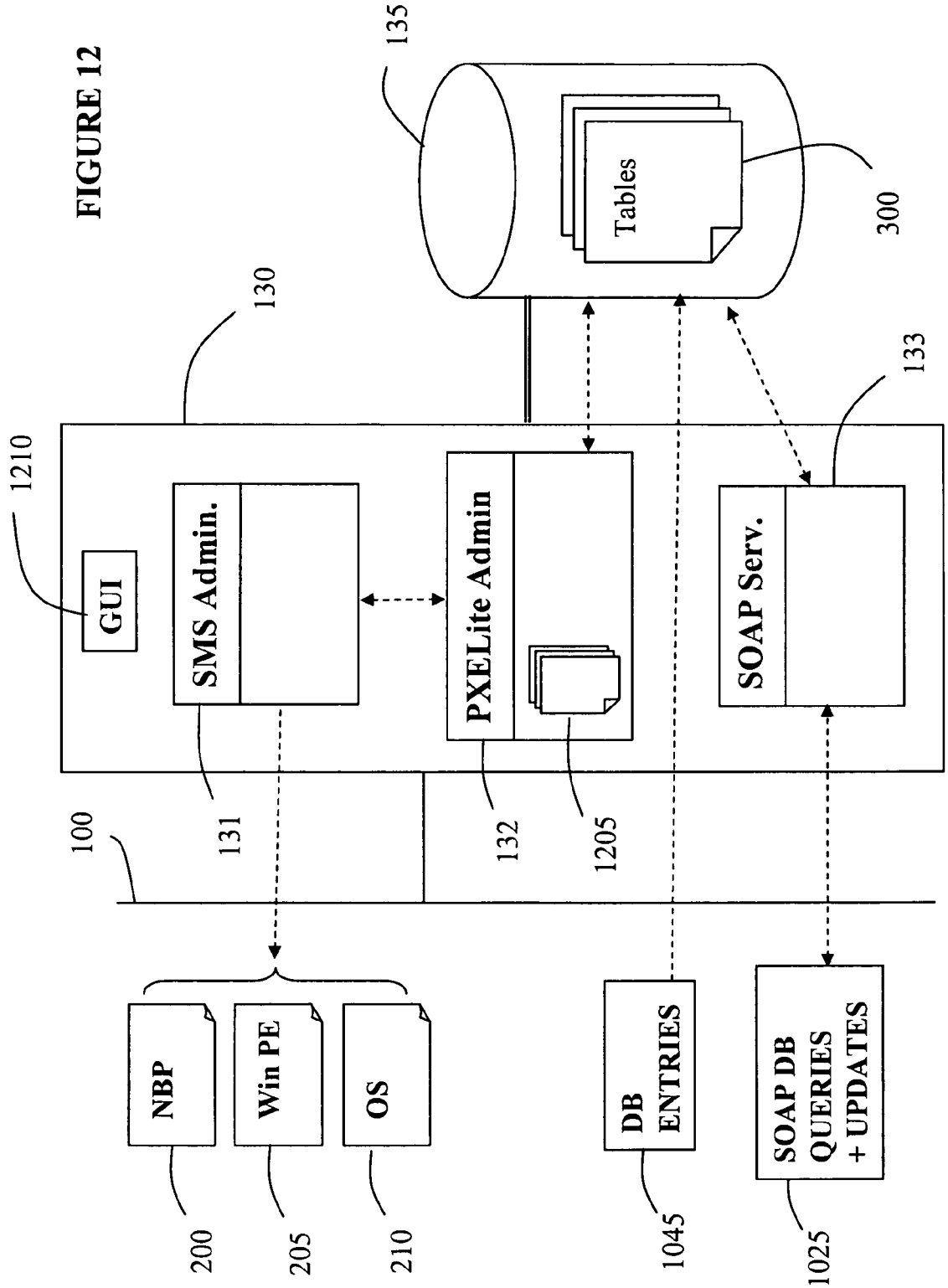
FIG. 12 shows inputs and outputs of a configuration database for use in the network booting arrangement.

Referring to FIG. 12, actions set in the database 135 and the OS image details assigned to any one machine 115 can be set via the PXE administration console 132 on the SMS server 130, or by interacting directly with the database.

Status values stored against any one machine 115 will be updated automatically under certain circumstances. For instance, it might be reset to return the boot action value "ignore" or "boot-to-hd" once an operating system image has been either successfully loaded or has failed. An example shown in FIG. 7 is that of STEP 16 in which the machine 115 notifies the database 135 that installation is complete. The boot status value will be reset to give a default boot action value.

OSD supports (a limited variety) of custom actions during operating system deployment. By not changing the database boot action entry until this has completed, OSD custom actions to restart the machine during the deployment process can be accommodated, and the machine will continue to boot from the network (into Windows PE 220, PXE Lite Agent 250 and OSD 255) until the installation has finished completely.

The value to which the boot action entry is changed is configurable. For example it can be set as default to "ignore" for both the default boot action and the default 'completed' action which is relatively unobtrusive; "boot-to-hd" is another option. These values are configured in the table 300 called "tb_PXELite_Settings" of the database 135.

It might be noted that if the database entry is set to return either of the values "ignore" or "boot-to-hd"—implying that a machine 115 should not even be in Windows PE—GetAgentAction returns "reboot". This causes the PXE Lite Agent 250 to exit, which causes Windows PE to exit, which causes the machine 115 to reboot.

Thus information is entered to the database 135 and obtained therefrom by means of:

entries via the SMS administrative system 131, such as OSD package IDs and program names available for entry to the table "tb_PXELite_Jobs"

entries via the PXE Lite administrative console 132 such as default boot action values in the table "tb_PXELite_Settings"

SOAP DB queries 1025: that is, use of the methods "GetBootAction" and "GetAgentAction" by the PXE Lite software on the nominated workstation 120 and by the DB entries 1045: that is, direct interaction with the database 135 for example via the GUI of a nominated workstation 120 or the PXE Lite administrator console 132

Regarding the entries via the SMS administrative system 131, a list of available OSD package IDs and program names is queried from SMS by the PXE Lite administrative console 132 and presented to the user to make a choice. Only the chosen values are stored in "tb_PXELite_Jobs".

As described above, the network boot files 200, WinPE 205 and the WIM (OS) files 210 are not stored on the database 135 but are assumed to be present in the subnetwork 100, for instance in the SMSNomad cache on the nominated workstation 120. The PXE Lite software 230 on the workstation 120 then needs to know the SMS package ID of these files in order to serve them to the booting machine 115. This can be stored as a configuration setting in the registry of the workstation 120. However, it would be a workable alternative to store the SMS package ID on the database 135.

Whilst the above embodiments describe obtaining agent action values such as "wait", "deploy" or "prompt", other agent actions are possible including those relating to operating systems in a broad sense, so as to control the installation of a BIOS or a firmware update for example.

As described above, for instance in relation to STEP 3, boot action data is stored in the database 135 in relation to each machine's MAC address. This gives machine-level control over the booting process. It would however be an alternative to allocate boot action data at a different level, for example by sub-network 100 or PXE Lite workstation 120. In this case, the workstation 120 might query the database 135 using the SOAP method "Get Boot Action" using an identifier for the sub-network 100 or PXE Lite workstation 120 instead of the machine's MAC address. However, delivering the machine's MAC address is a convenient way of notifying the database of a new machine for which state information is to be maintained.

It might be noted that, as described above, the PXE Lite Agent 250 provides interrogation of the database 135 with respect to the boot status data (or "boot action data") held in the "NextAction" field of the database 135. As an alternative, a value returned by the SOAP method "Get Agent Action" could instead be held in the network boot program 220 providing the agent 250. This might be implemented by the use of a custom script.

It will be understood that embodiments of the present invention may be supported by platform of various types and configurations. The presence of the platform is not essential to an embodiment of the invention. An embodiment of the present invention might therefore comprise software recorded on one or more data carriers, or embodied as a signal, for loading onto suitable platform for use. Further, the database 135 may in practice be located at two or more different network locations.

The invention claimed is:

1. A network, comprising:
a plurality of sub-networks; and
a systems management tool connected to, but not within, the plurality of sub-networks, the systems management tool having a database containing boot action data,
wherein one of the plurality of sub-networks includes a sub-network booting apparatus connected to a plurality of machines, at least one of the sub-network booting apparatus and one of the plurality of machines storing an image of an operating system,
wherein the sub-network booting apparatus is configured to provide a network boot program including a pre-installation environment, wherein the sub-network booting apparatus includes a processor configured to execute a first set of stored instructions that implements a method of booting at least one of the plurality of machines to the pre-installation environment, the instructions including:
  a boot initiation message detector for detecting a message sent by the machine to be booted to initiate a booting process; and
  a database interrogator, responsive to the boot initiation message detector, for interrogating the database to obtain boot action data stored in the database, the boot action data controlling the boot process on the machine to be booted,
wherein the sub-network booting apparatus and the machine to be booted include a second set of stored instructions that include instructions for copying the pre-installation environment to the machine to be booted in accordance with the boot action data, and
wherein the pre-installation environment includes instructions for causing a package location request for the machine to be booted to be broadcast on the sub-network to find the location of the image of the operating system in the sub-network, copy the located image to the machine to be booted, and install the operating system on the machine to be booted.

2. The network according to claim 1, wherein the pre-installation environment is stored at the sub-network booting apparatus.

3. The network according to claim 1, wherein the network boot program comprises a further database interrogator for interrogating a database in relation to boot action data stored in the database.

4. The network according to claim 1, wherein the network booting apparatus is a workstation.

5. The network according to claim 1, wherein the first set of stored instructions includes instructions to select a network boot program for provision to the machine from two or more different network boot programs, the selection being made in accordance with said boot action data.

6. The network according to claim 1, wherein the database interrogator is adapted to include an identifier in relation to the machine to be booted when interrogating a database in relation to boot action data.

7. The network according to claim 3, further comprising a storage location local to the machine for providing the network boot program.

8. The network according to claim 7, wherein said storage location comprises a location in the sub-network to which the machine is connected.

9. The network according to claim 7, wherein said storage location comprises a location in the same geographical location as the machine.

10. The network according to claim 5, wherein at least one of the at least two different network boot programs is arranged to cause the machine to be booted to cease booting from the network.

11. The network according to claim 3, wherein, on interrogation of a database by the further database interrogator, the network boot program is arranged to respond to a first type of boot action data by causing the further database interrogator to interrogate the database repeatedly until there is a change in boot action data.

12. The network according to claim 3, wherein said further database interrogator is adapted to obtain operating system identification data from the database for use in said installation of the operating system.

13. The network according to claim 12, wherein the network boot program further comprises a data reader for obtaining hardware data in relation to the machine for use in obtaining said operating system identification data.

14. The network according to claim 3, wherein the network boot program further comprises a database writer for entering or updating values in a database.

15. The network according to claim 13, wherein a database writer is adapted to enter to the database hardware data obtained by the data reader.

16. The network according to claim 1, further comprising a network boot program receiver for receiving one or more network boot programs via the network and storing the one or more programs in data storage available to the network booting apparatus.

17. The network according to claim 3, wherein the pre-installation environment provides a user interface for the machine and the network boot program and is arranged, on interrogation of the database, to respond to a type of boot action data by triggering a user prompt to the user interface.

18. The network according to claim 17, wherein said network boot program is arranged to receive operating system data from the user interface in response to the user prompt, for use in installation of an operating system to the machine.

19. The network according to claim 17, further comprising a database writer adapted to enter to the database operating system data obtained from the user interface.

20. The network according to claim 1, wherein the boot action data may comprise a value indicating no action to be taken by the sub-network booting apparatus in response to the detection of an initiating message and the sub-network booting apparatus is adapted so to respond.

21. The network according to claim 1, wherein the database interrogator and/or a further database interrogator are/is adapted to update values in a database in accordance with changes in booting status of the machine.

22. The network according to claim 1, wherein the database interrogator and/or a further database interrogator are/is adapted to interrogate a database using one or more pre-defined methods.

23. The network according to claim 22, wherein the database interrogator and the further database interrogator are adapted to interrogate the same database with respect to the same variable stored in the database, using two different respective predefined methods such that for at least one instance of the variable each method returns a different value to its respective interrogator.

24. The network according to claim 1, further comprising an administrative console having a user interface for viewing and updating at least one variable stored in the database.

25. The network according to claim 24, wherein the administrative console is provided with at least one rule, the rule being invoked on receipt by the database of an interrogation using a predefined method from the database interrogator to determine a value returned by the method.

26. A computer implemented method of booting a machine connected in a sub-network of a communications network, the communications network including a plurality of sub-networks and a systems management tool connected to, but not within, the plurality of sub-networks, the systems management tool having a database containing boot action data, the method comprising:
  at a network booting apparatus locally-connected to he a sub-network, detecting a message sent by the machine to initiate a booting process;
  on detection of the message at the locally-connected network booting apparatus, interrogating the database to obtain boot action data stored therein, the boot action data controlling the boot process on the machine;

copying a pre-installation environment, stored on the network booting apparatus, to the machine to be booted in accordance with the boot action data;

booting the machine to be booted to the pre-installation environment;

broadcasting a package location request on the sub-network to find the location of an operating system image stored in the sub-network;

copying the located operating system image to the machine to be booted; and installing the operating system on the machine to be booted.

27. The method according to claim 26, wherein the message is detected in said sub-network.

28. The method according to claim 26, further comprising interrogating the database at least a second time in relation to boot action data stored therein.

29. The method according to claim 26, wherein interrogating the database includes providing an identifier in relation to the machine such that the boot action data may be relevant to the respective machine.

30. The method according to claim 26, further comprising selecting a network boot program from a group of two or more different network boot programs for provision to the machine, in accordance with the boot action data.

31. The method according to claim 26, wherein the pre-installation environment includes a further database interrogator for interrogating the database in relation to further action data stored in the database, and further comprising using the further action data for controlling installation of an operating system.

32. The method according to claim 31, further comprising, on interrogation of a database by the further database interrogator, responding to a first type of the further action data by causing the further database interrogator to interrogate the database repeatedly until there is a change in boot action data.

33. The method according to claim 31, wherein the pre-installation environment includes an operating system installation program and further comprising, on interrogation of a database by the pre-installation environment, responding to a second type of the further action data by causing an operating system installation apparatus to install an operating system to the machine from the network.

34. The method according to claim 33, further comprising obtaining operating system identification data from the database for use in said installing of the operating system.

35. The method according to claim 26, wherein the pre-installation environment includes a data reader for obtaining hardware data in relation to the machine, and further comprising obtaining said operating system identification data.

36. The method according to claim 31, wherein the pre-installation environment includes a database writer and further comprising entering or updating values in a database.

37. The method according to claim 36, further comprising writing, to the database hardware, data obtained by a data reader.

38. The method according to claim 31, further comprising providing a user interface for the machine and, on interrogation of the database, responding to a third type of the further action data by triggering a user prompt to the user interface.

39. The method according to claim 38, further comprising receiving, by the pre-installation environment, operating system data from the user interface in response to the user prompt, and using the operating system data in said installing of the operating system to the machine.

40. The method according to claim 38, further comprising writing, to the database, operating system data obtained from the user interface.

41. The method according to claim 39, further comprising updating values in the database in accordance with changes in booting status of the machine.

42. The method according to claim 26, further comprising interrogating the database using one or more predefined methods.

43. The method according to claim 31, wherein the database interrogator and the further database interrogator interrogate the same database with respect to the same variable stored in the database, and further comprising using respective predefined methods such that for at least one instance of the variable each method returns a different value to its respective interrogator.

* * * * *

UNITED STATES PATENT AND TRADEMARK OFFICE
CERTIFICATE OF CORRECTION

PATENT NO. : 8,312,115 B2
APPLICATION NO. : 11/642960
DATED : November 13, 2012
INVENTOR(S) : Roger Lipscombe and Sophie Chang It is certified that error appears in the above-identified patent and that said Letters Patent is hereby corrected as shown below:

The words "he a" should be "the" (Col. 26, line 63).

Signed and Sealed this
Twenty-sixth Day of March, 2013

Teresa Stanek Rea
*Acting Director of the United States Patent and Trademark Office*